US008699088B2

(12) United States Patent  (10) Patent No.: US 8,699,088 B2
Cowburn  (45) Date of Patent: *Apr. 15, 2014

(54) METHODS AND APPARATUSES FOR CREATING AUTHENTICATABLE PRINTED ARTICLES AND SUBSEQUENTLY VERIFYING THEM

(75) Inventor: Russell Paul Cowburn, Gerrards Cross (GB)

(73) Assignee: Ingenia Holdings Limited, Road Town (VG)

( * ) Notice: Subject to any disclaimer, the term of this patent is extended or adjusted under 35 U.S.C. 154(b) by 0 days.
This patent is subject to a terminal disclaimer.

(21) Appl. No.: 13/368,236

(22) Filed: Feb. 7, 2012

(65) Prior Publication Data

US 2012/0170069 A1  Jul. 5, 2012

Related U.S. Application Data

(63) Continuation of application No. 10/592,593, filed as application No. PCT/GB2005/000903 on Mar. 9, 2005.

(60) Provisional application No. 60/601,463, filed on Aug. 13, 2004, provisional application No. 60/601,464, filed on Aug. 13, 2004, provisional application No. 60/610,075, filed on Sep. 15, 2004.

(30) Foreign Application Priority Data

Mar. 12, 2004 (GB) .................................. 0405641.2
Aug. 13, 2004 (GB) .................................. 0418138.4
Sep. 15, 2004 (GB) .................................. 0420524.1

(51) Int. Cl.
H04N 1/44 (2006.01)
H04N 1/04 (2006.01)
H04N 1/23 (2006.01)
B41M 3/14 (2006.01)
G06K 9/60 (2006.01)
G06K 9/74 (2006.01)
G06K 9/80 (2006.01)
G06K 15/02 (2006.01)
G06K 19/06 (2006.01)
G01N 21/47 (2006.01)

(52) U.S. Cl.
USPC .......... 358/3.28; 358/464; 358/474; 358/496; 382/100; 382/190; 382/218; 356/71; 356/337; 235/375; 235/470; 235/494

(58) Field of Classification Search
USPC ............. 358/3.28, 1.12, 1.14, 1.18, 464, 472, 358/474, 496; 382/100, 108, 135, 137, 190, 382/209, 217, 218, 286, 306, 312; 235/470, 235/474, 475, 487, 494, 375; 340/5.86; 356/71, 243.7, 337, 600, 601; 283/74; 380/55; 347/107
See application file for complete search history.

(56) References Cited

U.S. PATENT DOCUMENTS 3,781,109 A    12/1973    Mayer, Jr. et al.
(Continued)

FOREIGN PATENT DOCUMENTS

CA    2292594    12/1998
(Continued)

OTHER PUBLICATIONS

Written Opinion of the International Search Authority for International Application PCT/BG2007/000015, mailed Jul. 16, 2008, 8 pages.
(Continued)

Primary Examiner — Scott A Rogers
(74) Attorney, Agent, or Firm — McDonnell Boehnen Hulbert & Berghoff LLP

(57) ABSTRACT

A printer with integral scanner obtains a digital signature from an article as it is printed. The integral scanner has a coherent source which directs a light beam to illuminate the article and a detector arrangement to collect data points from light scattered from many different parts of the article to collect a large number of independent data points. The digital signature derived from the data points is stored in a database with an image of what was printed on the article. The authenticity of an article purported to be the originally printed article can be verified by scanning the purported genuine article to obtain its digital signature. The database is then searched, to establish whether there is a match. If a match is found, the image is displayed with the matched digital signature to allow a further visual check that the article is genuine.

8 Claims, 16 Drawing Sheets

(56) References Cited

U.S. PATENT DOCUMENTS

| | | |
|---|---|---|
| 3,877,019 A | 4/1975 | Auerbach et al. |
| 4,179,212 A | 12/1979 | Lahr |
| 4,218,674 A | 8/1980 | Brosow et al. |
| 4,423,415 A | 12/1983 | Goldman |
| 4,525,748 A | 6/1985 | Carbone |
| 4,537,504 A | 8/1985 | Baltes et al. |
| 4,544,266 A | 10/1985 | Antes |
| 4,568,936 A | 2/1986 | Goldman |
| 4,582,986 A | 4/1986 | Stockburger et al. |
| 4,599,509 A | 7/1986 | Silverman et al. |
| 4,738,901 A | 4/1988 | Finkel et al. |
| 4,748,316 A | 5/1988 | Dickson |
| 4,754,487 A | 6/1988 | Newmuis |
| 4,785,290 A | 11/1988 | Goldman |
| 4,791,669 A | 12/1988 | Kage |
| 4,797,921 A | 1/1989 | Shiraishi |
| 4,817,176 A | 3/1989 | Marshall et al. |
| 4,820,912 A | 4/1989 | Samyn |
| 4,882,764 A | 11/1989 | Reynolds et al. |
| 4,920,385 A | 4/1990 | Clarke et al. |
| 4,929,821 A | 5/1990 | Kocznar et al. |
| 5,003,596 A | 3/1991 | Wood |
| 5,054,066 A | 10/1991 | Riek et al. |
| 5,058,164 A | 10/1991 | Elmer et al. |
| 5,059,776 A | 10/1991 | Antes |
| 5,060,065 A | 10/1991 | Wasserman |
| 5,081,675 A | 1/1992 | Kittirutsunetorn |
| 5,103,479 A | 4/1992 | Takaragi et al. |
| 5,120,126 A | 6/1992 | Wertz et al. |
| 5,133,601 A | 7/1992 | Cohen et al. |
| 5,142,578 A | 8/1992 | Matyas et al. |
| 5,194,918 A | 3/1993 | Kino et al. |
| 5,243,405 A | 9/1993 | Tichenor et al. |
| 5,258,605 A | 11/1993 | Metlitsky et al. |
| 5,295,196 A | 3/1994 | Raterman et al. |
| 5,306,899 A | 4/1994 | Marom et al. |
| 5,307,423 A | 4/1994 | Gupta et al. |
| 5,325,167 A | 6/1994 | Melen |
| 5,384,717 A | 1/1995 | Ebenstein |
| 5,451,759 A | 9/1995 | Hoshino et al. |
| 5,453,840 A | 9/1995 | Parker et al. |
| 5,475,694 A | 12/1995 | Ivanov et al. |
| 5,485,312 A | 1/1996 | Horner et al. |
| 5,488,661 A | 1/1996 | Matsui |
| 5,510,199 A | 4/1996 | Martin |
| 5,521,984 A | 5/1996 | Denenberg et al. |
| 5,539,840 A | 7/1996 | Krtolica et al. |
| 5,546,462 A | 8/1996 | Indeck et al. |
| 5,637,854 A | 6/1997 | Thomas |
| 5,647,010 A | 7/1997 | Okubo et al. |
| 5,673,338 A | 9/1997 | Denenberg et al. |
| 5,687,002 A | 11/1997 | Itoh |
| 5,760,386 A | 6/1998 | Ward |
| 5,767,988 A | 6/1998 | Dobbs et al. |
| 5,781,708 A | 7/1998 | Austin et al. |
| 5,784,463 A | 7/1998 | Chen et al. |
| 5,790,025 A | 8/1998 | Amer et al. |
| 5,886,798 A | 3/1999 | Staub et al. |
| 5,903,340 A | 5/1999 | Lawandy et al. |
| 5,903,721 A | 5/1999 | Sixtus |
| 5,912,974 A | 6/1999 | Holloway et al. |
| 5,974,150 A | 10/1999 | Kaish et al. |
| 6,029,150 A | 2/2000 | Kravitz |
| 6,141,119 A | 10/2000 | Tseng et al. |
| 6,182,892 B1 | 2/2001 | Angelo et al. |
| 6,193,156 B1 | 2/2001 | Han et al. |
| 6,223,166 B1 | 4/2001 | Kay |
| 6,246,061 B1 | 6/2001 | Ramsey et al. |
| 6,265,907 B1 | 7/2001 | Sukegawa |
| 6,280,797 B1 | 8/2001 | Kuczynski et al. |
| 6,328,209 B1 | 12/2001 | O'Boyle |
| 6,332,663 B1 | 12/2001 | Puzio |
| 6,360,001 B1 | 3/2002 | Berger et al. |
| 6,373,573 B1 | 4/2002 | Jung et al. |
| 6,388,744 B1 | 5/2002 | Kubota et al. |
| 6,389,151 B1 | 5/2002 | Carr et al. |
| 6,390,368 B1 | 5/2002 | Edwards |
| 6,466,329 B1 | 10/2002 | Mukai |
| 6,473,165 B1 | 10/2002 | Coombs et al. |
| 6,529,269 B1 | 3/2003 | Sugata |
| 6,560,355 B2 | 5/2003 | Graves et al. |
| 6,563,129 B1 | 5/2003 | Knobel |
| 6,584,214 B1 | 6/2003 | Pappu et al. |
| 6,603,874 B1 | 8/2003 | Stern et al. |
| 6,605,819 B2 | 8/2003 | Ross |
| 6,621,916 B1 | 9/2003 | Smith et al. |
| 6,760,472 B1 | 7/2004 | Takeda et al. |
| 6,779,720 B2 | 8/2004 | Lewis |
| 6,798,900 B1 | 9/2004 | Sugata |
| 6,850,147 B2 | 2/2005 | Prokoski et al. |
| 6,885,977 B2 | 4/2005 | Gavra et al. |
| 6,902,111 B2 | 6/2005 | Han et al. |
| 6,928,552 B1 | 8/2005 | Mischenko et al. |
| 6,955,141 B2 | 10/2005 | Santanam et al. |
| 6,961,449 B2 | 11/2005 | Mil'shtein et al. |
| 7,002,675 B2 | 2/2006 | MacGibbon et al. |
| 7,082,216 B2 | 7/2006 | Jones et al. |
| 7,089,420 B1 | 8/2006 | Durst et al. |
| 7,104,449 B2 | 9/2006 | Han et al. |
| 7,110,573 B2 | 9/2006 | Monk et al. |
| 7,111,321 B1 | 9/2006 | Watts, Jr. et al. |
| 7,119,662 B1 | 10/2006 | Horigucchi et al. |
| 7,143,949 B1 | 12/2006 | Hannigan |
| 7,152,047 B1 | 12/2006 | Nagel |
| 7,162,035 B1 | 1/2007 | Durst et al. |
| 7,170,391 B2 | 1/2007 | Lane et al. |
| 7,221,445 B2 | 5/2007 | Earthman et al. |
| 7,268,923 B2 | 9/2007 | Schroath et al. |
| 7,277,183 B2 | 10/2007 | Deck |
| 7,318,048 B1 | 1/2008 | King |
| 7,333,629 B2 | 2/2008 | Patton et al. |
| 7,336,842 B2 | 2/2008 | Kondo |
| 7,346,184 B1 | 3/2008 | Carr et al. |
| 7,353,994 B2 | 4/2008 | Farrall et al. |
| 7,389,420 B2 | 6/2008 | Tian |
| 7,391,889 B2 | 6/2008 | Kim et al. |
| 7,394,573 B1 | 7/2008 | Goldberg et al. |
| 7,497,379 B2 | 3/2009 | Chen et al. |
| 7,567,349 B2 | 7/2009 | Tearney et al. |
| 7,577,844 B2 | 8/2009 | Kirovski |
| 7,599,927 B2 | 10/2009 | Lebrat |
| 7,599,963 B2 | 10/2009 | Fernandez |
| 7,647,279 B2 | 1/2010 | Bourrieres et al. |
| 7,716,297 B1 | 5/2010 | Wittel et al. |
| 7,773,749 B1 | 8/2010 | Durst et al. |
| 7,853,792 B2 | 12/2010 | Cowburn |
| 7,920,714 B2 | 4/2011 | O'Neil |
| 8,009,800 B2 | 8/2011 | Doyle et al. |
| 8,078,875 B2 | 12/2011 | Cowburn et al. |
| 8,171,567 B1 | 5/2012 | Fraser et al. |
| 8,270,603 B1 | 9/2012 | Durst et al. |
| 2001/0021926 A1 | 9/2001 | Schneck et al. |
| 2002/0041787 A1 | 4/2002 | Thomas |
| 2002/0061120 A1 | 5/2002 | Carr et al. |
| 2002/0091555 A1 | 7/2002 | Leppink |
| 2002/0105654 A1 | 8/2002 | Goltsos |
| 2002/0111837 A1 | 8/2002 | Aupperle |
| 2002/0116329 A1 | 8/2002 | Serbetcioglu et al. |
| 2002/0120592 A1 | 8/2002 | Juels et al. |
| 2002/0190953 A1 | 12/2002 | Gordon et al. |
| 2003/0002067 A1 | 1/2003 | Miyano |
| 2003/0012374 A1 | 1/2003 | Wu et al. |
| 2003/0018587 A1 | 1/2003 | Althoff et al. |
| 2003/0028494 A1 | 2/2003 | King et al. |
| 2003/0035539 A1 | 2/2003 | Thaxton |
| 2003/0093690 A1 | 5/2003 | Kemper |
| 2003/0105950 A1 | 6/2003 | Hirano et al. |
| 2003/0118191 A1 | 6/2003 | Wang et al. |
| 2003/0156294 A1 | 8/2003 | D'Agraives et al. |
| 2003/0156303 A1 | 8/2003 | Schnee et al. |
| 2003/0178487 A1 | 9/2003 | Rogers |
| 2003/0219145 A1 | 11/2003 | Smith |
| 2003/0231806 A1 | 12/2003 | Troyanker |
| 2004/0016810 A1 | 1/2004 | Hori et al. |

(56) References Cited

U.S. PATENT DOCUMENTS

| | | |
|---|---|---|
| 2004/0031849 A1 | 2/2004 | Hori et al. |
| 2004/0052377 A1 | 3/2004 | Mattox et al. |
| 2004/0059952 A1 | 3/2004 | Newport et al. |
| 2004/0101158 A1 | 5/2004 | Butler |
| 2004/0125488 A1 | 7/2004 | Zhu et al. |
| 2004/0155913 A1 | 8/2004 | Kosugi et al. |
| 2004/0156529 A1 | 8/2004 | Davis et al. |
| 2004/0190085 A1 | 9/2004 | Silverbrook et al. |
| 2004/0199765 A1 | 10/2004 | Kohane et al. |
| 2004/0212826 A1 | 10/2004 | Kashiwazaki |
| 2005/0006472 A1 | 1/2005 | Verschuur et al. |
| 2005/0038756 A1 | 2/2005 | Nagel |
| 2005/0044385 A1 | 2/2005 | Holdsworth |
| 2005/0060171 A1 | 3/2005 | Molnar |
| 2005/0060555 A1 | 3/2005 | Raghunath et al. |
| 2005/0077488 A1 | 4/2005 | Nekrasov et al. |
| 2005/0101841 A9 | 5/2005 | Kaylor et al. |
| 2005/0108057 A1 | 5/2005 | Cohen et al. |
| 2005/0110978 A1 | 5/2005 | Potyrailo et al. |
| 2005/0122209 A1 | 6/2005 | Black |
| 2005/0135260 A1 | 6/2005 | Todd |
| 2005/0178841 A1 | 8/2005 | Jones et al. |
| 2005/0180599 A1 | 8/2005 | Davis et al. |
| 2005/0199723 A1 | 9/2005 | Lubow |
| 2005/0217969 A1 | 10/2005 | Coombs et al. |
| 2006/0022059 A1 | 2/2006 | Juds |
| 2006/0102830 A1 | 5/2006 | Brill et al. |
| 2006/0104103 A1 | 5/2006 | Colineau et al. |
| 2006/0163504 A1 | 7/2006 | Fujimoto et al. |
| 2006/0166381 A1 | 7/2006 | Lange |
| 2006/0256959 A1 | 11/2006 | Hymes |
| 2006/0294583 A1 | 12/2006 | Cowburn et al. |
| 2007/0025619 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0053005 A1 | 3/2007 | Cowburn |
| 2007/0058037 A1 | 3/2007 | Bergeron et al. |
| 2007/0113076 A1 | 5/2007 | Cowburn et al. |
| 2007/0115497 A1 | 5/2007 | Cowburn |
| 2007/0136612 A1 | 6/2007 | Asano et al. |
| 2007/0153078 A1 | 7/2007 | Cowburn |
| 2007/0153269 A1 | 7/2007 | Wang et al. |
| 2007/0162961 A1 | 7/2007 | Tarrance et al. |
| 2007/0164729 A1 | 7/2007 | Cowburn et al. |
| 2007/0165208 A1 | 7/2007 | Cowburn et al. |
| 2007/0188793 A1 | 8/2007 | Wakai |
| 2007/0192850 A1 | 8/2007 | Cowburn |
| 2007/0199047 A1 | 8/2007 | Gibart et al. |
| 2007/0253001 A1 | 11/2007 | Watanabe et al. |
| 2007/0271456 A1 | 11/2007 | Ward et al. |
| 2008/0002243 A1 | 1/2008 | Cowburn |
| 2008/0016358 A1 | 1/2008 | Filreis et al. |
| 2008/0044096 A1 | 2/2008 | Cowburn et al. |
| 2008/0051033 A1 | 2/2008 | Hymes |
| 2008/0260199 A1 | 10/2008 | Cowburn et al. |
| 2008/0294900 A1 | 11/2008 | Cowburn |
| 2009/0016535 A1 | 1/2009 | Cowburn |
| 2009/0083372 A1 | 3/2009 | Teppler |
| 2009/0254991 A1 | 10/2009 | Boulanger et al. |
| 2009/0283583 A1 | 11/2009 | Cowburn et al. |
| 2009/0290906 A1 | 11/2009 | Cowburn |
| 2009/0303000 A1 | 12/2009 | Cowburn et al. |
| 2009/0307112 A1 | 12/2009 | Cowburn et al. |
| 2010/0007930 A1 | 1/2010 | Cowburn et al. |
| 2010/0008590 A1 | 1/2010 | Cowburn |
| 2010/0141380 A1 | 6/2010 | Pishva |
| 2010/0158377 A1 | 6/2010 | Cowburn et al. |
| 2010/0161529 A1 | 6/2010 | Cowburn et al. |
| 2010/0277446 A1 | 11/2010 | van Veenendaal et al. |

FOREIGN PATENT DOCUMENTS

| | | |
|---|---|---|
| CN | 1588847 | 3/2005 |
| DE | 19632269 | 2/1997 |
| DE | 19612819 | 10/1997 |
| DE | 10155780 | 5/2003 |
| DE | 10234431 | 2/2004 |
| EP | 0161181 | 11/1985 |
| EP | 0278058 | 8/1988 |
| EP | 0334201 | 9/1989 |
| EP | 0 378 198 | 7/1990 |
| EP | 0472192 | 2/1992 |
| EP | 0480620 | 4/1992 |
| EP | 0570162 | 11/1993 |
| EP | 0691632 | 1/1996 |
| EP | 0234105 | 9/1997 |
| EP | 1087348 | 3/2001 |
| EP | 1202225 A2 | 5/2002 |
| EP | 1217589 | 6/2002 |
| EP | 1273461 | 1/2003 |
| EP | 1286315 | 2/2003 |
| EP | 1388797 | 2/2004 |
| EP | 1418542 | 5/2004 |
| EP | 1484719 | 12/2004 |
| EP | 1507227 | 2/2005 |
| EP | 1577812 | 9/2005 |
| EP | 1587030 | 10/2005 |
| EP | 1616711 | 12/2005 |
| EP | 1990779 | 11/2008 |
| FR | 2765014 | 12/1998 |
| GB | 1319928 | 3/1972 |
| GB | 1458726 | 12/1976 |
| GB | 2097979 | 11/1982 |
| GB | 2221870 | 2/1990 |
| GB | 2228821 | 9/1990 |
| GB | 2411954 | 9/1995 |
| GB | 2304077 | 3/1997 |
| GB | 2346110 | 1/2000 |
| GB | 2346111 | 1/2000 |
| GB | 2417074 | 2/2006 |
| GB | 2417592 | 3/2006 |
| GB | 2417707 | 3/2006 |
| GB | 2426100 | 11/2006 |
| GB | 2428846 | 2/2007 |
| GB | 2428948 | 2/2007 |
| GB | 2429092 | 2/2007 |
| GB | 2429095 | 2/2007 |
| GB | 2429096 | 2/2007 |
| GB | 2429097 | 2/2007 |
| GB | 2431759 | 5/2007 |
| GB | 2433632 | 6/2007 |
| GB | 2434642 | 8/2007 |
| GB | 2462059 | 1/2010 |
| JP | H02-10482 | 1/1990 |
| JP | 2183879 | 7/1990 |
| JP | H03192523 | 8/1991 |
| JP | 04265847 | 9/1992 |
| JP | H05504220 | 7/1993 |
| JP | H06-111008 | 4/1994 |
| JP | H06-301840 | 10/1994 |
| JP | 07210721 | 8/1995 |
| JP | H08-003548 | 1/1996 |
| JP | H08-180189 | 7/1996 |
| JP | 09218910 | 8/1997 |
| JP | H10-063914 A | 6/1998 |
| JP | 63255793 | 10/1998 |
| JP | H11-224319 | 8/1999 |
| JP | 11339049 | 12/1999 |
| JP | 2000011230 | 1/2000 |
| JP | 2000149087 | 5/2000 |
| JP | 2000293105 | 10/2000 |
| JP | 2001521658 | 11/2001 |
| JP | 2003228709 | 2/2002 |
| JP | 2002092682 | 3/2002 |
| JP | 2004102562 | 4/2002 |
| JP | 2003509745 | 3/2003 |
| JP | 2003141595 | 5/2003 |
| JP | 2003143388 | 5/2003 |
| JP | 2003150585 | 5/2003 |

(56) References Cited

FOREIGN PATENT DOCUMENTS

| | | |
|---|---|---|
| JP | 2003534536 | 11/2003 |
| JP | 2004077954 | 3/2004 |
| JP | 2004171109 | 6/2004 |
| JP | 2005038389 | 2/2005 |
| JP | 2005217805 | 8/2005 |
| JP | 2005352854 | 12/2005 |
| JP | 2008523438 | 7/2008 |
| KR | 20050023050 | 3/2005 |
| NL | 8002604 | 12/1981 |
| NL | 9401796 C | 10/1994 |
| RU | 2043201 | 5/1993 |
| RU | 2065819 | 8/1996 |
| TW | 437229 | 5/2001 |
| TW | 570444 | 1/2004 |
| WO | 89/00742 | 1/1989 |
| WO | 91/11703 | 8/1991 |
| WO | 91/11778 | 8/1991 |
| WO | 91/19614 | 12/1991 |
| WO | 93/22745 | 11/1993 |
| WO | 95/24691 | 9/1995 |
| WO | 95/34018 | 12/1995 |
| WO | 96/36934 | 11/1996 |
| WO | 97/24699 | 7/1997 |
| WO | 99/13391 | 3/1999 |
| WO | 00/45344 | 8/2000 |
| WO | 00/46980 | 8/2000 |
| WO | 00/65541 | 11/2000 |
| WO | 01/18754 | 3/2001 |
| WO | 01/25024 | 4/2001 |
| WO | 01/43086 | 6/2001 |
| WO | 01/54077 A1 | 7/2001 |
| WO | 01/86574 | 11/2001 |
| WO | 01/86589 | 11/2001 |
| WO | 01/91007 | 11/2001 |
| WO | 02/50790 | 6/2002 |
| WO | 03/019463 | 3/2003 |
| WO | 03/087991 | 10/2003 |
| WO | 2004/025548 | 3/2004 |
| WO | 2004/025549 | 3/2004 |
| WO | 2004/057525 | 8/2004 |
| WO | 2004/070667 | 8/2004 |
| WO | 2004/097826 | 11/2004 |
| WO | 2004/109479 | 12/2004 |
| WO | 2005/004039 | 1/2005 |
| WO | 2005/004797 | 1/2005 |
| WO | 2005/027032 | 3/2005 |
| WO | 2005/029447 | 3/2005 |
| WO | 2005/048256 | 5/2005 |
| WO | 2005/078651 | 8/2005 |
| WO | 2005/080088 | 9/2005 |
| WO | 2005/086158 | 9/2005 |
| WO | 2005/088517 | 9/2005 |
| WO | 2005/088533 | 9/2005 |
| WO | 2005/122100 | 12/2005 |
| WO | 2006/016112 | 2/2006 |
| WO | 2006/016114 | 2/2006 |
| WO | 2006/021083 | 3/2006 |
| WO | 2006/132584 | 12/2006 |
| WO | 2007/012815 | 2/2007 |
| WO | 2007/012821 | 2/2007 |
| WO | 2007/028799 | 3/2007 |
| WO | 2007/071788 | 6/2007 |
| WO | 2007/072044 | 6/2007 |
| WO | 2007/080375 | 7/2007 |
| WO | 2007/111548 | 10/2007 |
| WO | 2007/144598 | 12/2007 |
| WO | 2009/141576 | 11/2009 |
| WO | 2010/004281 | 1/2010 |

OTHER PUBLICATIONS

Anderson, Ross J., Security Engineering: A Guide to Building Dependable Distributed Systems, Chapter 12: Security Printing and Seals, pp. 251-253 John Wiley & Sons, Inc. (2001).

Anonymous, "Discs and Paper Get Biometric Identifiers," IEE Review, p. 23, (Dec. 2004).

Buchanan et al., "'Fingerprinting' documents and packaging," Nature, vol. 436, p. 475 (Jul. 2005).

Chen et al., "Certifying Authenticity via Fiber-Infused Paper," ACM SIGecom Exchanges, vol. 5, No. 3, pp. 29-37 (Apr. 2005).

Cowburn, Russell, "Nanotechnology-Security and Brand Protection Applications 01," Smart Brand and Product Protection Conference 2005, Apr. 8, 2005 to Apr. 9, 2005, pp. 1-4, London, UK.

d'Agraives et al. "Surface Topography, A Remarkable Method for the Identification of Seals of Structures in General," Commission of the European Communities Joint Research Centre—Ispra Establishment I-21020 Ispra (Va), Italy, pp. 403-409 (1981).

Derrode S et al., "Robust and Efficient Fourier-Mellin Transform Approximations for Gray-Level Image Reconstruction and Complete Invariant Description," Computer Vision and Image Understanding, Academic Press, San Diego, CA, 83(1):57-78 (Jul. 2001).

El-Khamy S. E. et al., "The FBG stream cipher," Proceedings of the 24th Radio National Science Conference (NRSC 2007) IEEE Cairo, Egypt, pp. 1-8 (Mar. 2007).

International Search Report for Application No. PCT/GB2008/002020 mailed Jun. 10, 2005, 3 pages.

International Search Report for Great Britain Patent Application No. GB0711461.4 dated Sep. 21, 2007, 1 page.

Haist et al., "Optical detection of random features for high security applications," Optics Communications, 147:173-179 (1998).

Hao F. et al., "Combining crypto with biometrics effectively," IEEE Transactions on Computers IEEE USA, 55 (9):1081-1088 (Sep. 2006).

Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).

International Search Report for Great Britain Patent App. No. GB0607867.9, Aug. 22, 2006, 1 page.

International Search Report from International App. No. PCT/GB2005/000922 filed Mar. 9, 2005, 3 pages.

International Search Report for PCT/GB2007/002173 dated Sep. 19, 2007, 3 pages.

International Search Report and Written Report for PCT/GB2009/001702 dated Oct. 23, 2009, 12 pages.

International Search Report issued by UK Intellectual Property Office for GB0720673.3, dated Mar. 28, 2008, 2 pages.

Kirovski, Darko, "Toward an Automated Verification of Certificates of Authenticity," pp. 160-169 (2004).

Kravolec, "Plastic tag makes foolproof ID," Technology Research News, Oct. 2, 2002.

Kvasnik et al., "Image recognition using surface scattered light in a coherent optical processor," Image Processing and its Applications, University of Manchester Institute of Science and Technology UK, pp. 361-364 (1992).

Pappu et al., "Physical one-way functions," Science, American Association for the Advancement of Science, vol. 297, No. 5589, pp. 2026-2030 (2002).

Ravikanth, Pappu Srinivasa. "Physical One-Way Functions," pp. 3-154, Mar. 2001.

Schneier B., "Applied Cryptography. Protocols, Algorithms, and Source Code in C, Passage," Applied Cryptography, 2nd Ed., John Wiley & Sons, Inc., New York, p. 197 (1996).

Simmons, G.J. A survey of information authentication, in <i>Contemporary Cryptology, The Science of Information Integrity </i>, pp. 379-419 IEEE Press (1992).

Smalley, Eric, "Plastic Tag makes foolproof ID," Technology Research News, Oct. 2, 2002.

Smith et al., "Microstructure Based Indicia," Laboratories Escher Group, pp. 1-5 (1999).

UK Search Report for GB0812772.2 dated Nov. 6, 2008, 1 page.
UK Search Report for GB0812773 dated Mar. 2009, 2 pages.
UK Search Report for GB0812773 dated Nov. 2008, 2 pages.

(56) References Cited

OTHER PUBLICATIONS

Van Renesse R.L., "Optical inspection techniques for security instrumentation," Proceedings of SPIE—The International Society for Optical Engineering, Vo. 2659, pp. 159-167 (Mar. 1996).

Wilkes, Sally, "Fighting Fraud: Document Biometrics," Materials World, vol. 12, No. 12, pp. 29-30 (Dec. 2004).

Zhang D et al., "Shape-based image retrieval using generic Fourier descriptor," Signal Processing. Image Communication, Ellsevier Science Publishers, Amsterdam, NL 17(10):825-848 (Nov. 2002).

Zwick/Roell—Zwick Materials testing—the new direction in extension measurement—optiXtens, 11 pages.

Agilent Technologies, "Agilent Data Sheet HEDS 1500," Agilent Technologies, www.digchip.com, 1999, 6 pages.

European Patent Office, Notice of Opposition for EP2374111, dated Nov. 4, 2013, 20 pages.

The International Bureau of WIPO, International Preliminary Report on Patentability and Written Opinion for PCT/GB2007/002173, dated Dec. 16, 2008, 7 pages.

Métois, Eric et al., "FiberFingerprint identification" In Proc. 3rd Workshop on Automatic Identification, Mar. 2002, pp. 147-154.

METHODS AND APPARATUSES FOR CREATING AUTHENTICATABLE PRINTED ARTICLES AND SUBSEQUENTLY VERIFYING THEM

CROSS-REFERENCE TO RELATED APPLICATIONS

This is a continuation of application Ser. No. 10/592,593, filed Aug. 15, 2007, which is the U.S. national stage of International Application No. PCT/GB05/00903, filed Mar. 9, 2005, and which claims the benefit of Application No. 60/601,463, filed Aug. 13, 2004, Application No. 60/601,464, filed Aug. 13, 2004, Application No. 60/610,075, filed Sep. 15, 2004, GB 0405641.2, filed Mar. 12, 2004, GB 0420524.1, filed Sep. 15, 2004, and GB 0418138.4, filed Aug. 13, 2004. All of these applications are incorporated herein by reference.

BACKGROUND OF THE INVENTION

The invention relates to security methods, more especially verification of authenticity of a printed document or other printed article such as a personal identification (ID) card, cardboard packaging item, or a unique document such as a bill of lading or document bearing an original signature, seal or stamp.

Many traditional authentication security systems rely on a process which is difficult for anybody other than the manufacturer to perform, where the difficulty may be imposed by expense of capital equipment, complexity of technical know-how or preferably both. Examples are the provision of a watermark in bank notes and a hologram on credit cards or passports. Unfortunately, criminals are becoming more sophisticated and can reproduce virtually anything that original manufacturers can do.

Because of this, there is a known approach to authentication security systems which relies on creating security tokens using some process governed by laws of nature which results in each token being unique, and more importantly having a unique characteristic that is measurable and can thus be used as a basis for subsequent verification. According to this approach tokens are manufactured and measured in a set way to obtain a unique characteristic. The characteristic can then be stored in a computer database, or otherwise retained. Tokens of this type can be embedded in the carrier article, e.g. a banknote, passport, ID card, important document. Subsequently, the carrier article can be measured again and the measured characteristic compared with the characteristics stored in the database to establish if there is a match.

Within this general approach it has been proposed to use different physical effects. One effect that has been considered is to measure a magnetic response characteristic from depositions of magnetic materials, where each sample has a unique magnetic response as a result of naturally occurring defects in the magnetic material which form in an irreproducible manner [1]. Another effect that has been considered in a number of prior art documents is to use laser speckle from intrinsic properties of an article to provide a unique characteristic.

GB 2 221 870 A [2] discloses a method in which a security device, such as an ID card, effectively has a token embossed on it. The form of the token is a structured surface derived from a master. The speckle pattern from the light scattering structure is unique to the master and therefore can be measured to prove authenticity of the token on the security device. The token on the security device is measured in a reader which has a laser for generating a coherent beam of a size roughly equal to the token (2 mm diameter) and a detector, such as a charged coupled device (CCD) detector, for measuring the speckle pattern created by the interaction of the laser beam with the token. The resulting data is recorded. For verification, a security device can be placed in the reader and its recorded speckle pattern signal compared against a similar recorded signal from a reference device created from the same master.

U.S. Pat. No. 6,584,214[3] describes an alternative to using speckle patterns in reflection from a specially prepared surface structure, in which speckle patterns are instead used in transmission from a specially prepared transparent token. The preferred implementation of this technique is to prepare epoxy tokens of dimension approximately 1 cm×1 cm in which glass spheres are embedded. The tokens are prepared by mixing the glass spheres in a colloidal suspension in a liquid polymer, which is then cured to fix the positions of the glass spheres. The unique ensemble of glass spheres is then probed using a coherent laser beam in transmission with a CCD detector positioned to measure the speckle pattern. In a modification of this approach, a known identifier is encoded on a reflective surface which is then stuck to one side of the token. The probing light passes through the token, is reflected by the known identifier and passes through the token again. The glass spheres thus modify the speckle pattern so that a unique hashed key is generated from the known identifier.

Kralovec [4] briefly reports that in the 1980's workers at Sandia National Laboratories in the US experimented with special banknote paper which was impregnated with chopped-up optical fibres. A speckle pattern could be measured from the optical fibres and a digitally signed version of this printed as a barcode on the side of the note. However, Kralovec reports that this idea could not be made to work properly, because the optical fibres were too fragile and the speckle pattern changed rapidly when the banknote was circulated owing to wear. This meant that the speckle pattern measured from the optical fibres in a used banknote no longer matched the barcode, so the banknote could no longer be authenticated from the speckle pattern in the intended manner.

Anderson [5] on page 251 of his 2001 text book also briefly refers to what appears to be a similar scheme to that described by Kravolec [4] which is used for monitoring arms control agreements. Anderson observes that many materials have surfaces that are unique or that can be made so by eroding them with a small explosive charge. This is said to make it easy to identify capital equipment such as heavy artillery, where identifying each gun barrel is enough to prevent cheating by either party to an arms control agreement. Anderson reports that the surface pattern of the gun barrel is measured using laser speckle techniques, and either recorded in a log or attached to the device as a machine-readable digital signature.

Instead of using laser speckle, there is a more-straightforward group of proposed schemes that simply image an article at high resolution and use this high resolution image as the unique characteristic, which can then be re-imaged subsequently for verification of authenticity. This may be regarded as an adaptation of the conventional approach used for fingerprint libraries held by police forces.

U.S. Pat. No. 5,521,984[6] proposes using an optical microscope to take an image of a small area of a valuable article, such as a painting, sculpture, stamp, gem or specific document.

Anderson [5] on page 252 of his 2001 text book reports that postal systems were considering schemes of this kind based on direct imaging of envelopes with a microscope. It is reported that an image of the paper fibres of an envelope is made, a pattern extracted, and recorded in the postal franking mark, which is digitally signed.

U.S. Pat. No. 5,325,167[7] proposes imaging the grain structure of toner particles on a part of a valuable document following a similar scheme.

Through this previous work, there are various desirable features that are apparent for an ideal verification scheme.

The reported magnetic or speckle based techniques appear to be capable of providing high security levels, but require special materials to be prepared [1, 2, 3] for practical implementation to ensure long-term stability of the probed structure [4]. In many cases, integration of a token into the article to be secured is non-trivial. Particularly, integration of a resin token or a magnetic chip in paper or cardboard is not easy and involves significant cost. For integration with paper or cardboard, any token should ideally be printable. Additionally, there is also an inherent security risk of an attachable token-based approach in that the token is potentially detachable and attachable to a different article.

The reported direct imaging techniques [5, 6, 7] have the advantage that they obtain their digital signature directly from the article, obviating the need for special tokens. However, their intrinsic security is low. For example they are vulnerable to fraudulent access to the stored image data which may allow fabrication of an article that could be verified incorrectly as being authentic, or to forging by simply using a high resolution printer to print an image of what would be seen under a microscope when viewing the relevant part of the genuine article. The security level of direct imaging techniques also scales with the volume of the image data, forcing use of expensive high resolution imaging equipment for higher security levels. This may be acceptable in some applications, such as postal sorting or banknote verification, but in many applications will be unacceptable.

SUMMARY OF THE INVENTION

The invention provides a new system in which verifiable documents or other printable articles can be generated and later verified without difficulty and with a high level of security. A printer with integral scanner is provided for obtaining a digital signature from a sheet of paper or other article as it is printed. The integral scanner illuminates the article and collects data points from coherent light scattered from many different parts of the article as it is printed to collect a large number of independent data points, typically 500 or more. The digital signature derived from the data points is stored in a database with an image of what was printed on the article. At a later time, the authenticity of an article purported to be the originally printed article can be verified by scanning the purported genuine article to obtain its digital signature. The database is then searched to establish whether there is a match. If a match is found, the image stored in the database with the matched digital signature is displayed to the user to allow a further visual check that the article is genuine. The image is displayed together with other relevant bibliographic data relevant to the article. This provides a high security system which also includes human verification in the form of the visual comparison between the document or other printed article being examined and the document or other printed article shown on the display.

In this way a printer can be used normally, with each item printed being automatically scanned and its digital signature logged in a database together with an image file of the item. Each printed item can then be later verified as being authentic or not. For example, photocopies or forgeries can be distinguished easily from an original, since the digital signature is unique to the printed substrate, e.g. the sheet of paper on which has been printed.

Different aspects of the invention relate to the printing device with integral scanner, an apparatus for creating authenticatable articles that is operable with the printing device, as well as an apparatus for later verifying the authenticity of an article presented as being genuine or otherwise needing to be checked for its authenticity. Corresponding methods of creating authenticatable articles and verifying the authenticity of articles constitute further aspects of the invention.

The invention provides in one aspect a printing device, comprising: a print head for printing onto an article; a feed mechanism operable to convey the article past the print head; and a scan head incorporating a coherent source and a detector arrangement, wherein the coherent source is arranged to direct light onto an article conveyed by the feed mechanism and a detector arrangement arranged to collect a set of data points from signals obtained as the light scans over the article, wherein different ones of the data points relate to scatter from different parts of the article.

The invention provides in another aspect an apparatus for creating authenticatable articles, comprising: a printer driver operable to create instructions for a printing device to print an image; a data acquisition interface for receiving a set of data points from signals obtained by scanning coherent light over an article during printing, wherein different ones of the data points relate to scatter of the coherent light from different parts of the article; and a processor for determining a digital signature of the article from the set of data points and creating a record in a database, wherein the record includes the digital signature and a representation of the image.

The invention provides in a further aspect an apparatus for verifying the authenticity of articles, comprising: a scanning device incorporating a coherent source for scanning light over an article, and a detector arrangement arranged to collect a set of data points from signals obtained as the light is scanned, wherein different ones of the data points relate to scatter of the coherent light from different parts of the article; a processor for determining a digital signature of the article from the set of data points; a database comprising a plurality of records of previously scanned articles, each record including the digital signature previously determined for that article and a visual representation of that article; and a signature verification module operable to search the database to establish whether there is a match between a digital signature obtained by the scanning device and a digital signature stored in one of the records, and, if a match is found, to display the visual representation of the article stored in the record with the match.

In addition the user may be presented with a confidence level of the match, which indicates to what extent the digital signatures from the original scan and the re-scan correspond. In this respect it is noted that, the re-scanned digital signature even from a genuine item will never match its stored database counterpart perfectly. The test of a match or non-match is one of degree of similarity between the originally scanned signature held in the master database and the re-scanned signature. We find that a typical good quality match has approximately 75% of the bits in agreement, compared to an average of 50% agreement for a fraudulent match.

The database records may usefully include bibliographic data relevant to the scanned article. Moreover, the signature verification module will display the bibliographic data when a match is found. For example, in the case of a document, the bibliographic data may include a summary description of the document in narrative text and an indication of the date of creation, the creating person, and the printer i.d. of the printer used to create the document.

The invention provides in a still further aspect a method of creating authenticatable articles, comprising: printing an image onto an article; scanning coherent light over the article, and collecting a set of data points from signals obtained as the coherent light is scattered from the article, wherein different ones of the data points relate to scatter from different parts of the article; determining a digital signature of the article from the set of data points; and creating a record in a database, wherein the record includes the digital signature and a representation of the image.

The invention also provides another method of creating authenticatable articles, comprising: scanning coherent light over the article, and collecting a set of data points from signals obtained as the coherent light is scattered from the article, wherein different ones of the data points relate to scatter from different parts of the article; determining a digital signature of the article from the set of data points; and printing onto the article an image and a label that encodes the digital signature according to a machine-readable encoding protocol. The label is thus characteristic of the intrinsic structure of the article. In this case, the signature is preferably encoded in the label using an asymmetric encryption algorithm. For example, the label may represent a cryptogram decipherable by a public key in a public key/private key encryption system. It is highly convenient for many printable materials, especially paper and cardboard, if the label is an ink label applied with a printing process, preferably in the same process as article creation, i.e. in the same process as printing the image onto the document. For example, a piece of paper could be printed on with the image and then fed again through the printer to have the signature-encoding label printed on using a duplex sheet feeding mechanism. The label may be visible, e.g. a barcode, or invisible, e.g. embodied as data in a smart chip when the article is a smart card.

The printing and scanning is conveniently performed as the article is conveyed past a print head and a scan head respectively.

The invention provides in yet a further aspect a method of verifying the authenticity of an article, comprising: scanning coherent light over an article, and collecting a set of data points from signals obtained as the coherent light is scattered from the article, wherein different ones of the data points relate to scatter from different parts of the article; determining a digital signature of the article from the set of data points; providing a database comprising a plurality of records for previously scanned articles, each record including the digital signature previously determined for that article and a visual representation of that article; and searching the database to establish whether there is a match between a digital signature obtained by the scanner and any of the digital signatures stored in the database, and, if a match is found, displaying the visual representation of the article stored in the database.

It will be appreciated that the article can be made of paper or cardboard, or any other printable substrate with a surface suitable for providing a digital signature when scanned in the manner of the invention. It will also be understood that references to light should not be limited to visible electromagnetic radiation and include infra-red and ultra-violet radiation for example.

The invention is considered to be particularly useful for paper or cardboard articles from the following list of examples:

1. valuable documents such as share certificates, bills of lading, passports, intergovernmental treaties, statutes, driving licenses, vehicle roadworthiness certificates, any certificate of authenticity
2. any document for tracing or tracking purposes, e.g. envelopes for mail systems, banknotes for law enforcement tracking
3. packaging of vendable products
4. brand labels on designer goods, such as fashion items
5. packaging of cosmetics, pharmaceuticals, or other products
6. notarised and legalised original documents
7. identity cards and papers.

For example, selected batches of a particular kind of printed article may be generated for tracing or tracking. A batch of bank notes could be printed specifically introducing into known criminal circles, for example to pay ransoms or bribes, or to purchase illegal drugs. These would be identical to normal bank notes, but logged onto a database so that the database not only included a unique digital signature of the bank note paper of each note, but also an image of the bank note including its serial number.

It is expected that any other printable substrate material will be identifiable by the invention provided that it has suitable surface structure. Material types that have very smooth surfaces at a microscopic level may be unsuitable. Suitability of a printable material can be determined easily by testing some representative samples.

In one group of embodiments, the data acquisition and processing module is operable to further analyse the data points to identify a signal component that follows a predetermined encoding protocol and to generate a reference signature therefrom. The characteristic of the predetermined encoding protocol is envisaged to be based on contrast, i.e. scatter signal strength, in most embodiments. In particular, a conventional barcode protocol may be used in which the barcode is printed or otherwise applied to the article in the form of stripes in the case of a 1D barcode or more complex patterns for a 2D barcode. In this case, the data acquisition and processing module can be operable to perform a comparison to establish whether the reference signature matches the signature obtained by reading an article that has been placed in the reading volume. Consequently, an article such as a piece of paper, can be marked to bear a digitally signed version of its own characteristic, such as a barcode. The reference signature should be obtained from the article's characteristic with a one-way function, i.e. using an asymmetric encryption algorithm that requires a private key. This acts as a barrier to an unauthorised third party with a reader, who wants to read fake articles and print on them a label that represents the reader's scan according to the encryption scheme. Typically the barcode label or other mark would represent a cryptogram decipherable by a public key, and the private key would be reserved for the authorised labellor party.

The database may be part of a mass storage device that forms part of the reader apparatus, or may be at a remote location and accessed by the reader through a telecommunications link. The telecommunications link may take any conventional form, including wireless and fixed links, and may be available over the internet. The data acquisition and processing module may be operable, at least in some operational modes, to allow the signature to be added to the database if no match is found. This facility will usually only be allowed to authorised persons for obvious reasons.

In addition to storing the signature it is thus useful to associate that signature in the database with other information about the article such as a scanned copy of the document, a photograph of a passport holder, details on the place and time of manufacture of the product, or details on the intended sales destination of vendable goods (e.g. to track grey importation).

The signature is envisaged to be a digital signature in most applications. Typical sizes of the digital signature with current technology would be in the range 200 bits to 8 k bits, where currently it is preferable to have a digital signature size of about 2 k bits for high security.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
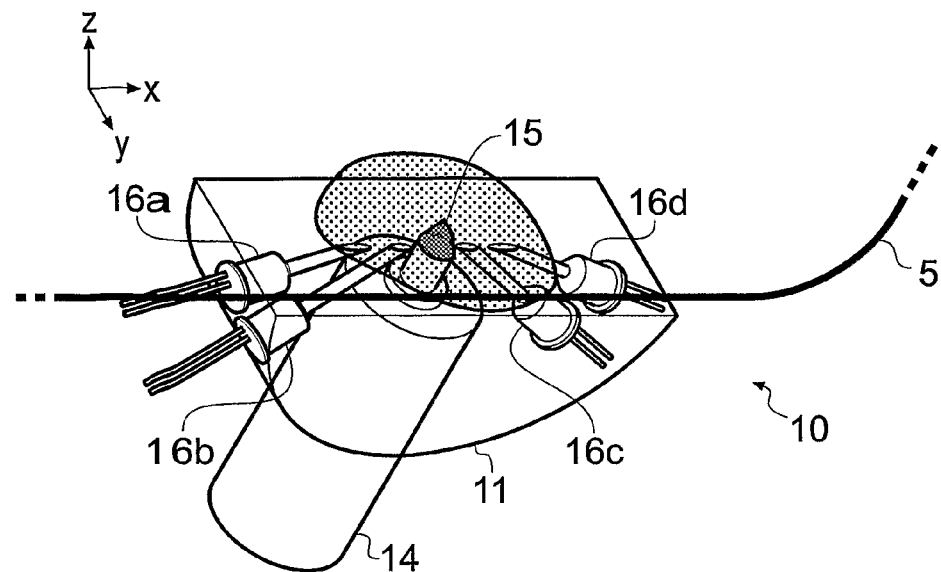
FIG. 1A is a perspective view of a scan head of an embodiment of the invention with a sheet of paper also being shown.
Figure 1B:
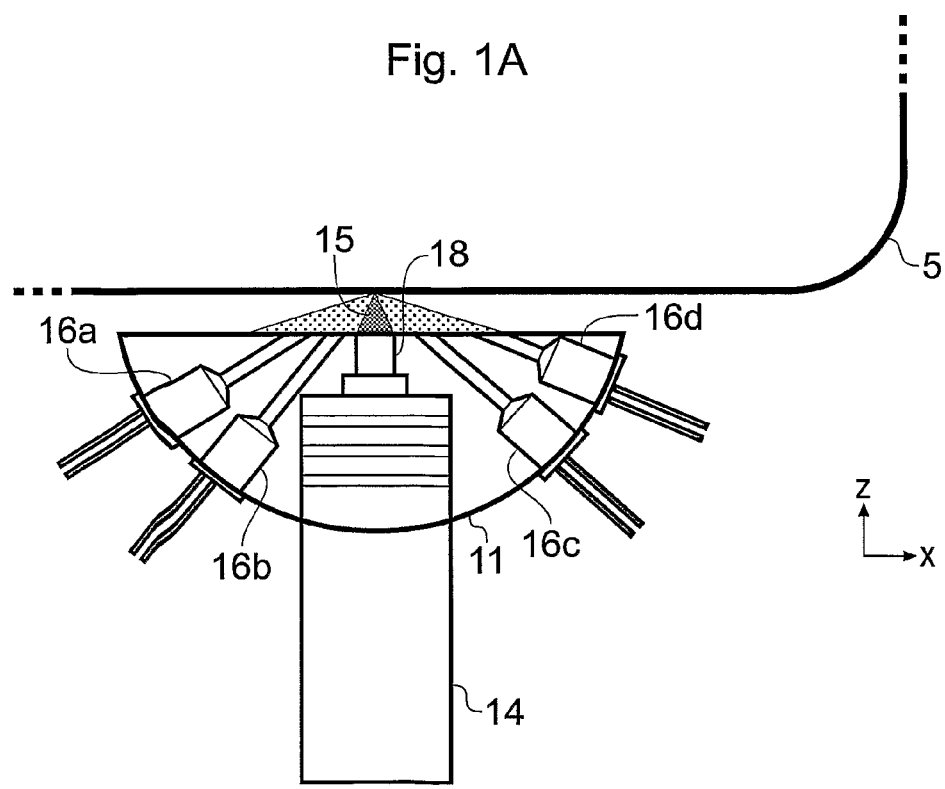
FIG. 1B is a side view of the scan head of FIG. 1A with a sheet of paper.

FIGS. 1A and 1B are schematic representations in perspective and side view respectively of a scan head 10 of an embodiment of the invention. The scan head 10 is for measuring a digital signature from a piece of paper 5 or other printable article which is conveyed past the scan head 10 in the x-direction through its reading volume (see inset axes in the drawing). The principal optical components are a laser source 14 for generating a coherent laser beam 15 and a detector arrangement 16 made up of a plurality of k photodetector elements, where k=4 in this example, labelled 16a, 16b, 16c and 16d. The laser beam 15 is focused by a cylindrical lens 18 into an elongate focus extending in the y direction (perpendicular to the plane of the drawing) and lying in the plane of the paper path. In an example prototype, the elongate focus has a major axis dimension of about 2 mm and a minor axis dimension of about 40 micrometers. These optical components are contained in a mounting block 11. In the illustrated embodiment, the four detector elements 16a . . . d are distributed either side of the beam axis offset at different angles in an interdigitated arrangement from the beam axis to collect light scattered in reflection from an article present in the reading volume. In an example prototype, the offset angles are −70, −20, +30 and +50 degrees. Light access to the detector elements 16a . . . d is provided by through holes in the mounting block 11. The angles either side of the beam axis are chosen so as not to be equal so that the data points they collect are as independent as possible. All four detector elements are arranged in a common plane. The photodetector elements 16a . . . d detect light scattered from the surface of paper 5 being conveyed past the scan head 10 when the coherent beam scatters from the paper 5. As illustrated, the source is mounted to direct the laser beam 15 with its beam axis in the z direction, so that it will strike the paper 5 at normal incidence.

Generally it is desirable that the depth of focus is large, so that any differences in the paper positioning in the z direction do not result in significant changes in the size of the beam incident on the paper. In an example prototype, the depth of focus is approximately 0.5 mm which is sufficiently large to produce good results. The parameters, of depth of focus, numerical aperture and working distance are interdependent, resulting in a well known trade off between spot size and depth of focus.

When the scan head 10 is integrated into an otherwise conventional printer, the paper feed mechanism will serve to move the paper linearly in the x direction past the scan head 10 so that the beam 15 is scanned in a direction transverse to the major axis of the elongate focus. Since the coherent beam 15 is dimensioned at its focus to have a cross-section in the xz plane (plane of the drawing) that is much smaller than a projection of the reading volume in a plane normal to the coherent beam, i.e. in the plane of the paper 5, the paper feed will cause the coherent beam 15 to sample many different parts of the paper.

Figure 2:
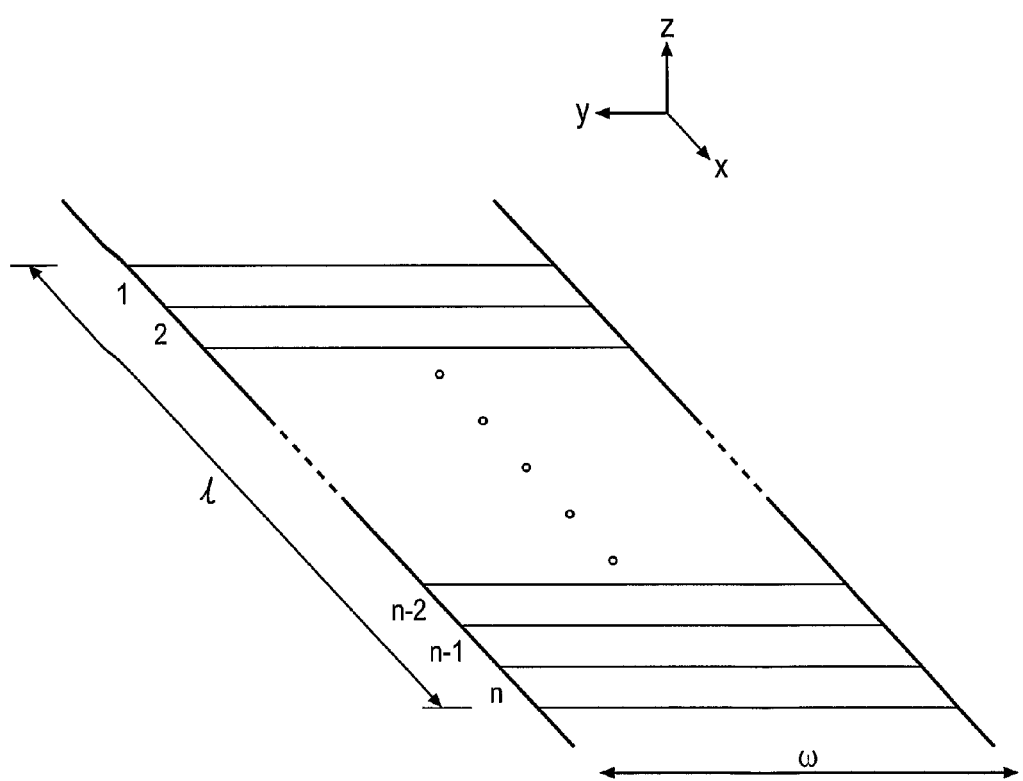
FIG. 2 is a schematic perspective view showing how the paper surface is sampled n times over its scan area by scanning an elongate beam across it.

FIG. 2 is included to illustrate this sampling and is a schematic perspective view showing how the reading area is sampled n times by scanning an elongate beam across it. The sampling positions of the focused laser beam as it is scanned over the paper under action of the paper feed is represented by the adjacent rectangles numbered 1 to n which sample an area of length '1' and approximate width 'w', where 'w' is the long dimension of the cylindrical focus. Data collection is made so as to collect signal at each of the n positions as the paper is conveyed past the scan head. Consequently, a sequence of k×n data points are collected that relate to scatter from the n different illustrated parts of the paper. Typically, only a portion of the paper's length will be sampled. For example, length '1' may be approximately a few centimeters.

With an example minor dimension of the focus of 40 micrometers, and a scan length in the x direction of 2 cm, n=500, giving 2000 data points with k=4. A typical range of values for k×n depending on desired security level, article type, number of detector channels 'k' and other factors is expected to be 100<k×n<10,000. It has also been found that increasing the number of detectors k also improves the insensitivity of the measurements to surface degradation of the article through handling, printing etc. In practice, with the prototypes used to date, a rule of thumb is that the total number of independent data points, i.e. k×n, should be 500 or more to give an acceptably high security level with a wide variety of surfaces.

Figure 3:
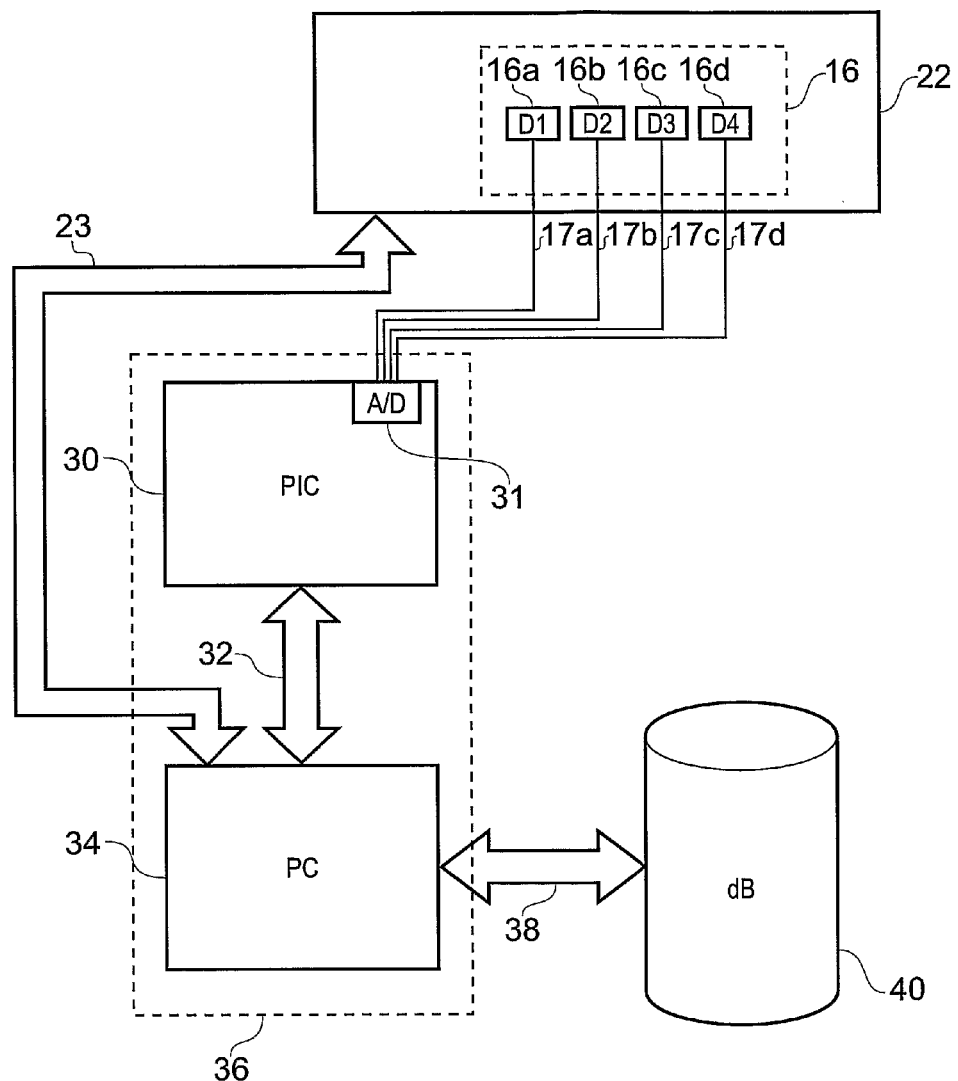
FIG. 3 is a block schematic diagram of the functional components of a system for creating authenticatable articles.

FIG. 3 is a block schematic diagram of the functional components of a system for creating authenticatable articles. A printer 22 is connected to a personal computer (PC) 30 with a conventional connection 25. The detectors 16a . . . d of the detector module 16 are connected through respective electrical connection lines 17a . . . d to an analogue-to-digital converter (ADC) that is part of a programmable interrupt controller (PIC) 30. It will be understood that optical or wireless links may be used instead of, or in combination with, electrical links. The PIC 30 is interfaced with a personal computer (PC) 34 through a serial connection 32. The PC 34 may be a desktop or a laptop. As an alternative to a PC, other intelligent devices may be used, for example a personal digital assistant (PDA) or a dedicated electronics unit. The PIC 30 and PC 34 collectively form a data acquisition and processing module 36 for determining a signature of the article from the set of data points collected by the detectors 16a . . . d. The PC 34 has access through an interface connection 38 to a database (dB) 40. The database 40 may be resident on the PC 34 in memory, or stored on a drive thereof. Alternatively, the database 40 may be remote from the PC 34 and accessed by wireless communication, for example using mobile telephony services or a wireless local area network (LAN) in combination with the internet. Moreover, the database 40 may be stored locally on the PC 34, but periodically downloaded from a remote source.

The database 40 is for compiling a library of digital signatures. The PC 34 is programmed so that in use it obtains scan data from the detectors 16a . . . d each time a document is printed out by the printer 22 and from this data computes a digital signature. A new record is then created in the database 40 containing the digital signature, an image file of what has been printed on the piece of paper and also bibliographic data relevant to the document.

Figure 4:
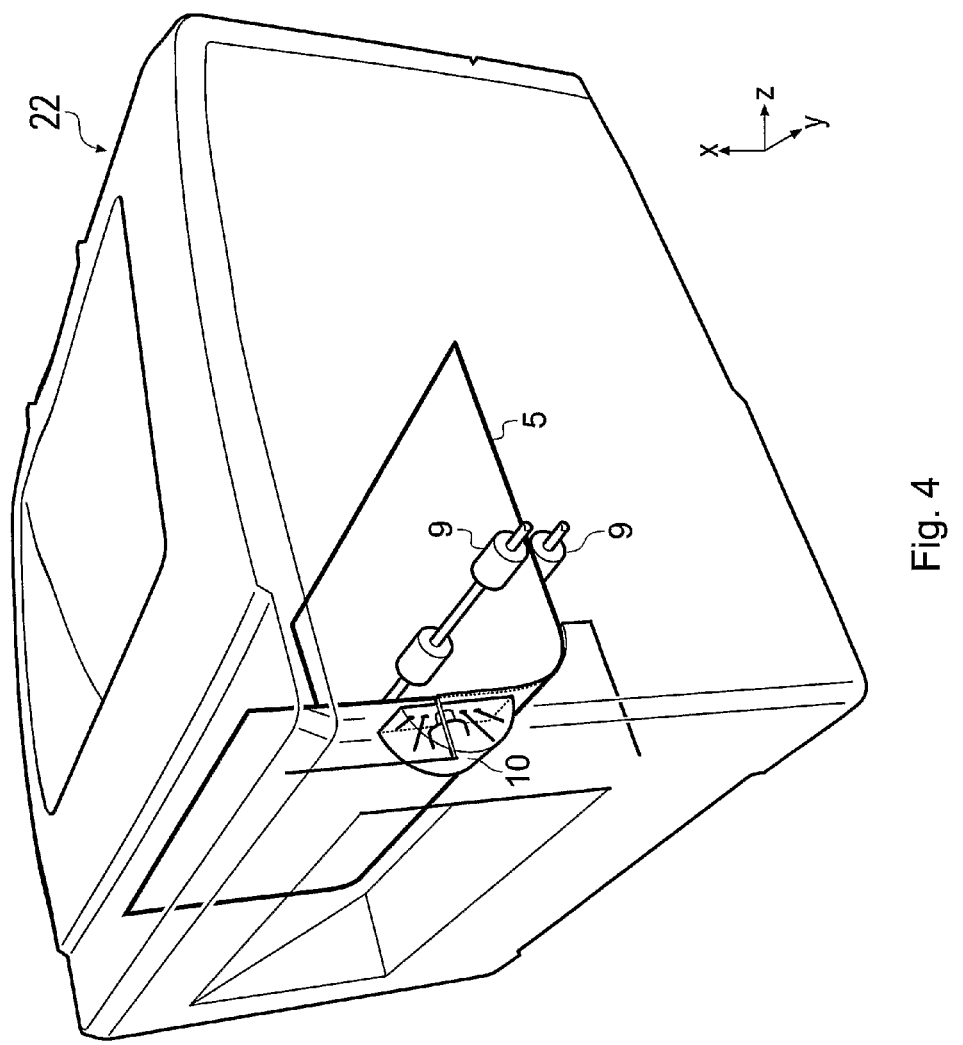
FIG. 4 is a perspective view of a printing device with integral scan head.

FIG. 4 is a perspective view of a printer 22 with the above-described scan head 10 integrated into it. The printer 22 is conventional other than by virtue of the scan head and associated electronics. To schematically represent the paper feed mechanism the final roller pair 9 thereof is shown. It will be appreciated that the paper feed mechanism includes additional rollers and other mechanical parts. In the prototype built already, the scan head is for convenience mounted as illustrated directly after the final roller paper. It will be appreciated that the scan head could be mounted in many different positions along the feed path of the paper. Moreover, although the illustration is of a laser printer, it will be appreciated that any kind of printing device could be used. As well as other forms of printer, such as inkjet printers or thermal printers, the printing device could be any other kind of printing device not conventionally regarded as a printer, such as a networked photocopier machine, or an industrial printing press. For example, the printing device could be a printing press for printing bank notes, cheques, or travellers cheques.

The above-described embodiments are based on localised excitation with a coherent light beam of small cross-section in combination with detectors that accept light signal scattered over a much larger area that includes the local area of excitation. It is possible to design a functionally equivalent optical system which is instead based on directional detectors that collect light only from localised areas in combination with excitation of a much larger area.

Figure 5:
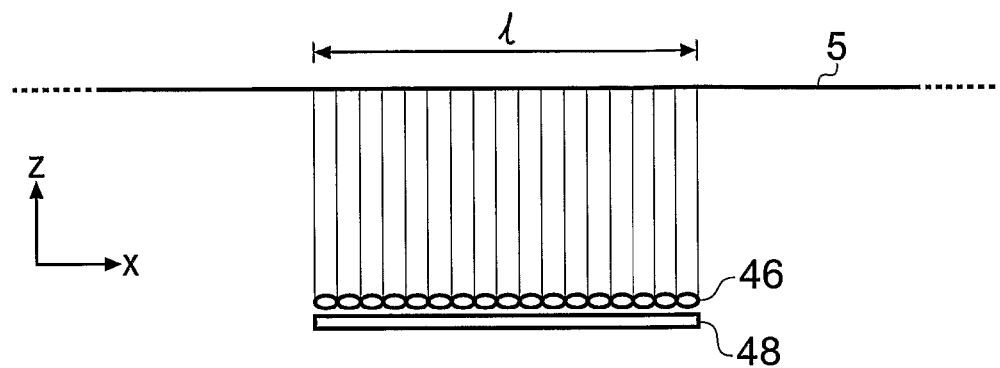
FIG. 5 shows schematically in side view an alternative imaging arrangement for a scanner embodying the invention based on directional light collection and blanket illumination.

FIG. 5 shows schematically in side view such an imaging arrangement for a reader embodying the invention which is based on directional light collection and blanket illumination with a coherent beam. An array detector 48 is arranged in combination with a cylindrical microlens array 46 so that adjacent strips of the detector array 48 only collect light from corresponding adjacent strips along the paper 5. With reference to FIG. 2, each cylindrical microlens is arranged to collect light signal from one of the n sampling strips. The coherent illumination can then take place with blanket illumination of the whole area being sampled (not shown in the illustration).

A hybrid system with a combination of localised excitation and localised detection may also be useful in some cases.

Figure 6:
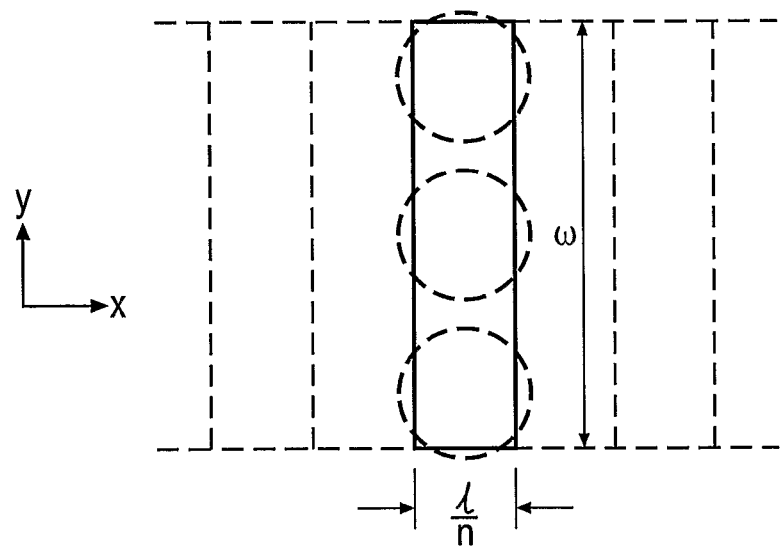
FIG. 6 shows schematically in plan view the optical footprint of a further alternative imaging arrangement for a scanner embodying the invention in which directional detectors are used in combination with localised illumination with an elongate beam.

FIG. 6 shows schematically in plan view the optical footprint of such a hybrid imaging arrangement for a scanner embodying the invention in which directional detectors are used in combination with localised illumination with an elongate beam. This embodiment may be considered to be a development of the embodiment of FIGS. 1A & 1B in which directional detectors are provided. In this embodiment three banks of directional detectors are provided, each bank being targeted to collect light from different portions along the '1×w' excitation strip. The collection area from the plane of the reading volume are shown with the dotted circles, so that a first bank of, for example 2, detectors collects light signal from the upper portion of the excitation strip, a second bank of detectors collects light signal from a middle portion of the excitation strip and a third bank of detectors collects light from a lower portion of the excitation strip. Each bank of detectors is shown having a circular collection area of diameter approximately 1/m, where m is the number of subdivisions of the excitation strip, where m=3 in the present example. In this way the number of independent data points can be increased by a factor of m for a given scan length 1. As described further below, one or more of different banks of directional detectors can be used for a purpose other than collecting light signal that samples a speckle pattern. For example, one of the banks may be used to collect light signal in a way optimised for barcode scanning in the case that a barcode is printed, for example to encode some aspect of the document, such as its bibliographic data. If this is the case it will generally be sufficient for that bank to contain only one detector, since there will be no advantage obtaining cross-correlations when only scanning for contrast.

Having now described the principal structural components and functional components of various apparatuses suitable for carrying out the invention, the numerical processing used to determine a digital signature is now described. It will be understood that this numerical processing is implemented for the most part in a computer program that runs on the PC 34 with some elements subordinated to the PIC 30.

Figure 7:
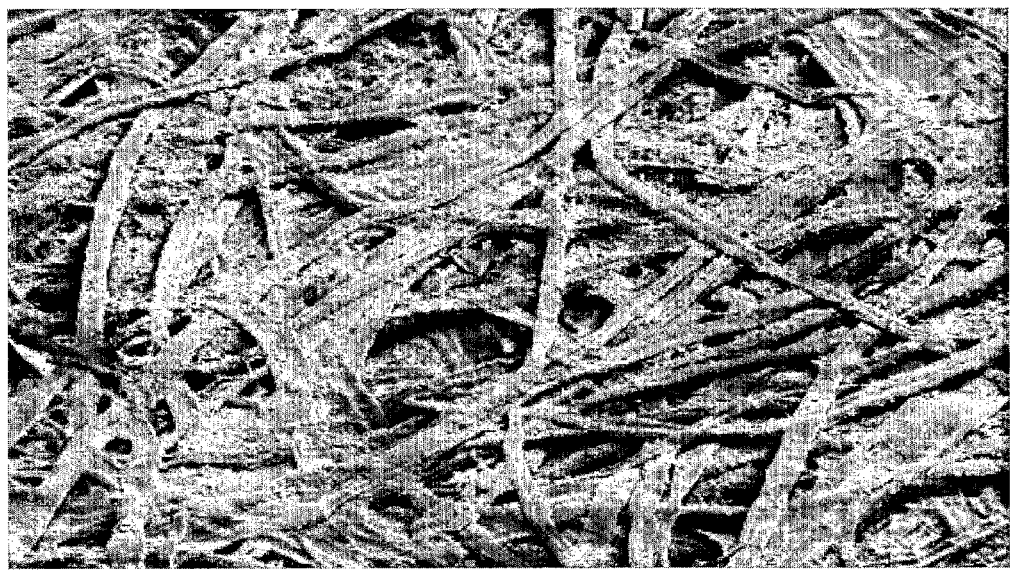
FIG. 7 is a microscope image of a paper surface with the image covering an area of approximately 0.5×0.2 mm.

FIG. 7 is a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood fibres that make up paper. The figure is also illustrative of the characteristic length scale for the wood fibres which is around 10 microns. This dimension has the correct relationship to the optical wavelength of the coherent beam to cause diffraction and hence speckle, and also diffuse scattering which has a profile that depends upon the fibre orientation. It will thus be appreciated that if a scan head is to be designed for a specific class of printable substrate material, the wavelength of the laser can be tailored to the structure feature size of the class of material to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

In other words, the inventor has discovered that it is essentially pointless to go to the effort and expense of making specially prepared tokens, when unique characteristics are measurable in a straightforward manner from a wide variety of every day articles. The data collection and numerical processing of a scatter signal that takes advantage of the natural structure of an article's surface (or interior in the case of transmission) is now described.

Figure 8A:
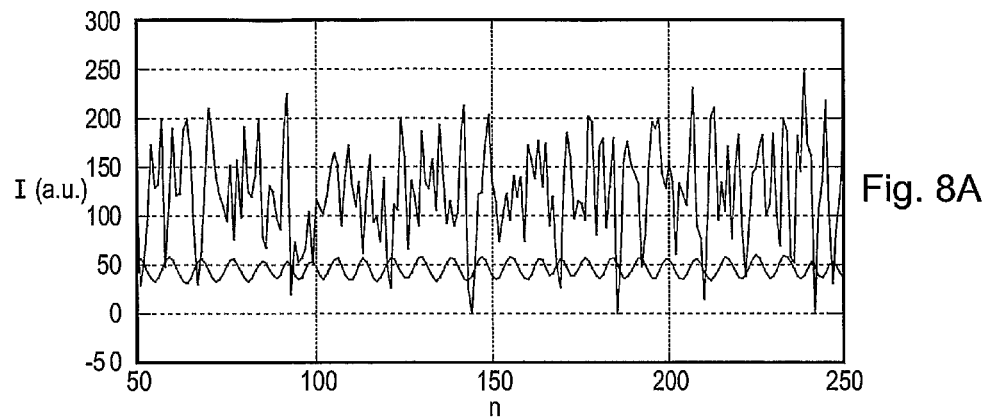
FIG. 8A shows raw data from a single photodetector using the scan head of FIG. 1A which consists of a photodetector signal and an encoder signal.

FIG. 8A shows raw data from a single one of the photodetectors 16a . . . d of the scan head of FIG. 1A. The graph plots signal intensity I in arbitrary units (a.u.) against point number n (see FIG. 2). The higher trace fluctuating between I=0-250 is the raw signal data from photodetector 16a. The lower trace is the encoder signal picked up from the markers 28 (see FIG. 2) which is at around I=50.

Figure 8B:
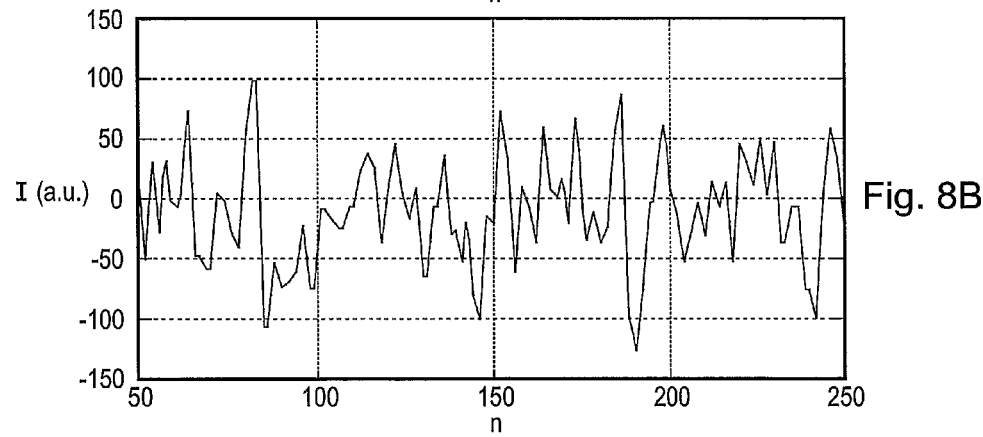
FIG. 8B shows the photodetector data of FIG. 8A after linearisation with the encoder signal and averaging the amplitude.

FIG. 8B shows the photodetector data of FIG. 8A after linearisation with the encoder signal (n.b. although the x axis is on a different scale from FIG. 8A, this is of no significance). In addition, the average of the intensity has been computed and subtracted from the intensity values. The processed data values thus fluctuate above and below zero.

Figure 8C:
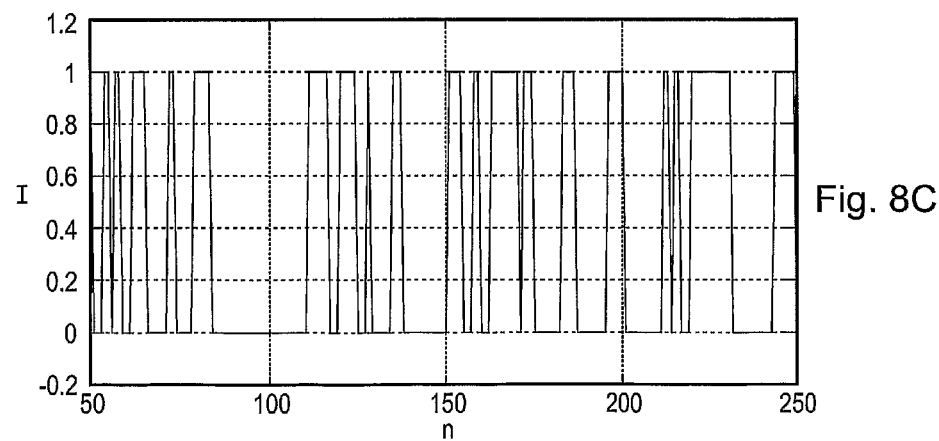
FIG. 8C shows the data of FIG. 8B after digitisation according to the average level.

FIG. 8C shows the data of FIG. 8B after digitisation. The digitisation scheme adopted is a simple binary one in which any positive intensity values are set at value 1 and any negative intensity values are set at zero. It will be appreciated that multi-state digitisation could be used instead, or any one of many other possible digitisation approaches. The main important feature of the digitisation is merely that the same digitisation scheme is applied consistently.

Figure 9:
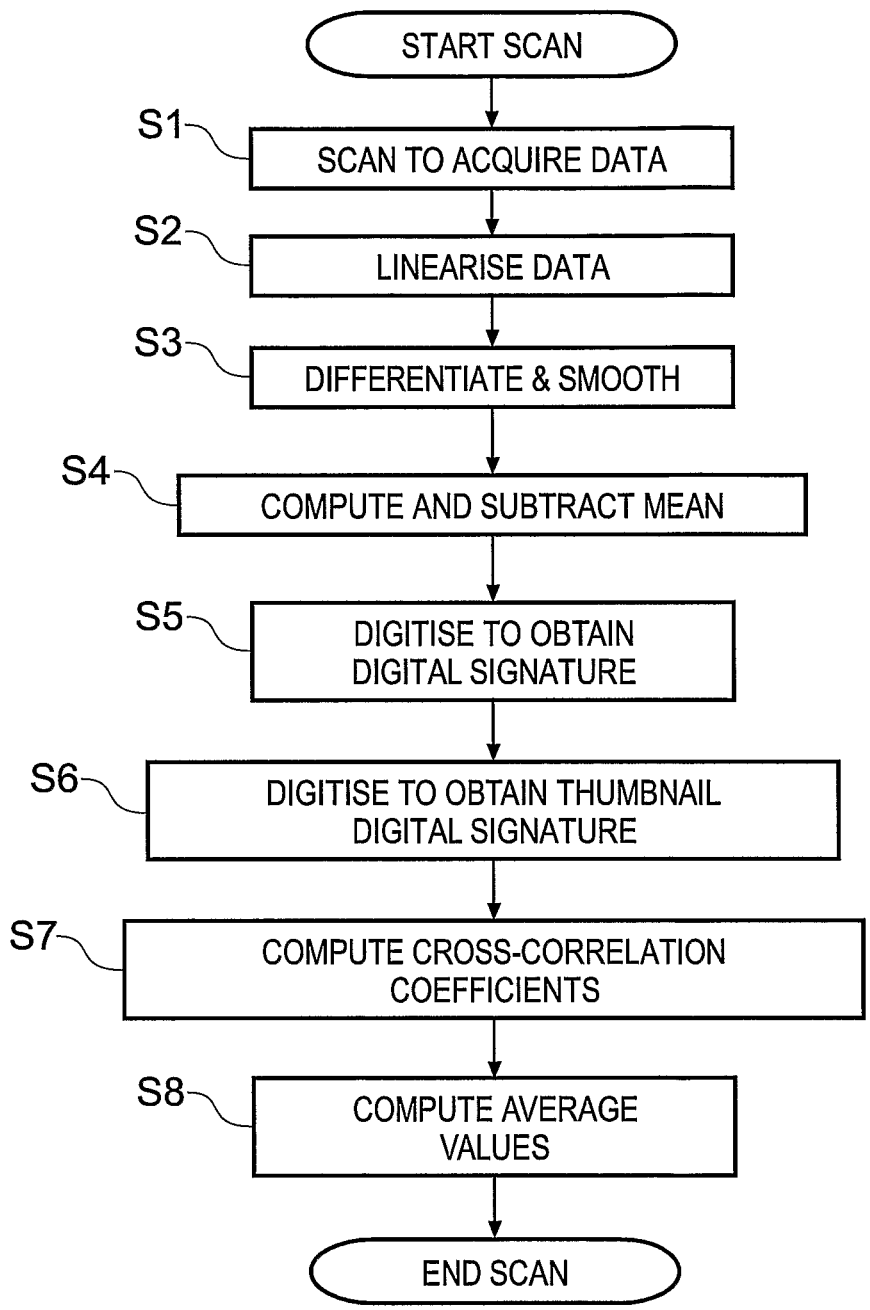
FIG. 9 is a flow diagram showing how a digital signature of an article is generated from a scan.

FIG. 9 is a flow diagram showing how a signature of an article is generated from a scan.

Step S1 is a data acquisition step during which the optical intensity at each of the photodetectors is acquired approximately every 1 ms during the entire length of scan. Simultaneously, the encoder signal is acquired as a function of time. It is noted that if the paper feed mechanism has a high degree of linearisation accuracy then linearisation of the data may not be required. The data is acquired by the PIC 30 taking data from the ADC 31. The data points are transferred in real time from the PIC 30 to the PC 34. Alternatively, the data points could be stored in memory in the PIC 30 and then passed to the PC 34 at the end of a scan. The number n of data points per detector channel collected in each scan is defined as N in the following. Further, the value $a_k(i)$ is defined as the i-th stored intensity value from photodetector k, where i runs from 1 to N. Examples of two raw data sets obtained from such a scan are illustrated in FIG. 8A.

Step S2 uses numerical interpolation to locally expand and contract $a_k(i)$ so that the encoder transitions are evenly spaced in time. This corrects for local variations in the motor speed. This step is performed in the PC 34 by a computer program.

Step S3 is an optional step. If performed, this step numerically differentiates the data with respect to time. It may also be desirable to apply a weak smoothing function to the data. Differentiation may be useful for highly structured surfaces, as it serves to attenuate uncorrelated contributions from the signal relative to correlated (speckle) contributions.

Step S4 is a step in which, for each photodetector, the mean of the recorded signal is taken over the N data points. For each photodetector, this mean value is subtracted from all of the data points so that the data are distributed about zero intensity. Reference is made to FIG. 8B which shows an example of a scan data set after linearisation and subtraction of a computed average.

Step S5 digitises the analogue photodetector data to compute a digital signature representative of the scan. The digital signature is obtained by applying the rule: $a_k(i) > 0$ maps onto binary '1' and $a_k(i) <= 0$ maps onto binary '0'. The digitised data set is defined as $d_k(i)$ where i runs from 1 to N. The signature of the article may advantageously incorporate further components in addition to the digitised signature of the intensity data just described. These further optional signature components are now described.

Step S6 is an optional step in which a smaller 'thumbnail' digital signature is created. This is done either by averaging together adjacent groups of in readings, or more preferably by picking every cth data point, where c is the compression factor of the thumbnail. The latter is preferred since averaging may disproportionately amplify noise. The same digitisation rule used in Step S5 is then applied to the reduced data set. The thumbnail digitisation is defined as $t_k(i)$ where i runs 1 to N/c and c is the compression factor.

Step S7 is an optional step applicable when multiple detector channels exist. The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients are useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where $k \neq l$ and k,l vary across all of the photodetector channel numbers. The normalised cross-correlation function $\Gamma$ is defined as $$\Gamma(k,l) = \frac{\sum_{i=1}^{N} a_k(i) a_l(i)}{\sqrt{\left(\sum_{i=1}^{N} a_k(i)^2\right)\left(\sum_{i=1}^{N} a_l(i)^2\right)}}$$

The use of the cross-correlation coefficients in verification processing is described further below.

Step S8 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background.

The digital signature data obtained from scanning an article can then be written to the database by adding a new record together with an image file of what has been printed onto the substrate and associated bibliographic data. A new database record will include the digital signature obtained in Step S5 as well as optionally its smaller thumbnail version obtained in Step S6 for each photodetector channel, the cross-correlation coefficients obtained in Step S7 and the average value(s) obtained in Step S8. Alternatively, the thumbnails may be stored on a separate database of their own optimised for rapid searching, and the rest of the data (including the thumbnails) on a main database. It is noted that the same process can be used when obtaining a digital signature for verification purposes subsequently as is described further below.

Figure 10:
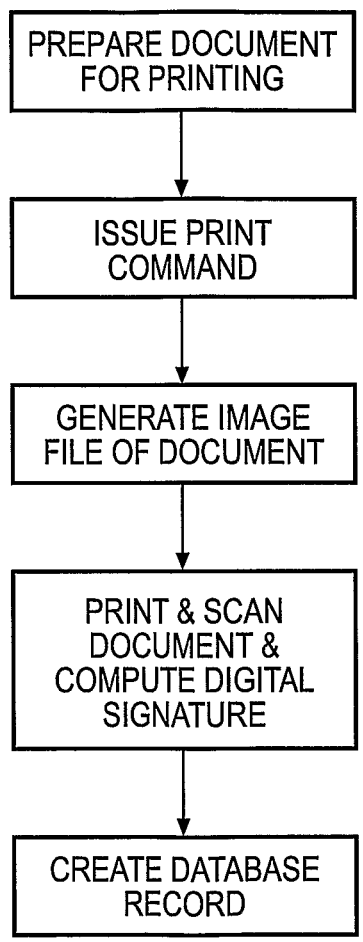
FIG. 10 is a flow diagram showing a printing process during which the paper being printed on is scanned and its digital signature computed and stored in a database.

FIG. 10 is a flow diagram showing a printing process during which the paper being printed on is scanned and its digital signature computed and stored in a database. A user of the PC 30 prepares a document for printing using a word processor, drawing package or other type of application software for creating documents. Once the document is ready, a print command is issued. An image file is then created by the application software using an appropriate printer driver. This image file is then sent to the printer for printing. As the paper on which the image is being printed is being fed through the printer, the scan head scans a portion of the paper. The scatter signals thus collected are converted into data points as described above and a digital signature is computed according the process described above with reference to FIG. 9. A database record is then created to store not only the digital signature, but also the image file and relevant bibliographic data relating to the document creation.

It is noted that it is convenient to store the image file created by the printer driver, but that is not the only possibility. The image file could be another file type derived from the printer driver image file, or an image file in a preferred format of the application software used to create the document, or another format created by the application software. Another possibility would be for the image file to be derived from a rescan of the document after printing. For example, this could be done automatically in a printing device in the format of a networked photocopier machine that has sophisticated paper feed (and re-feed) options and an integrated document scanner. In this case, the image representation stored in the database would include any features on the substrate as well as what was printed on the substrate. For example, if the paper is headed paper, the header would be included. This may be advantageous in some circumstances. A wide variety of solutions is possible. All that is important is to store some kind of visual representation of what has been printed.

The above text describes how documents are scanned at source inside a printing device whenever they are generated in order to obtain a digital signature unique to the paper or other substrate on which some representation has been printed, and the digital signature stored in a database together with a representation of what has been printed.

The following text describes how documents generated in this way can later be verified as authentic, or alternatively how documents can be tested to establish whether they have been generated by the authorised source.

Figure 11:
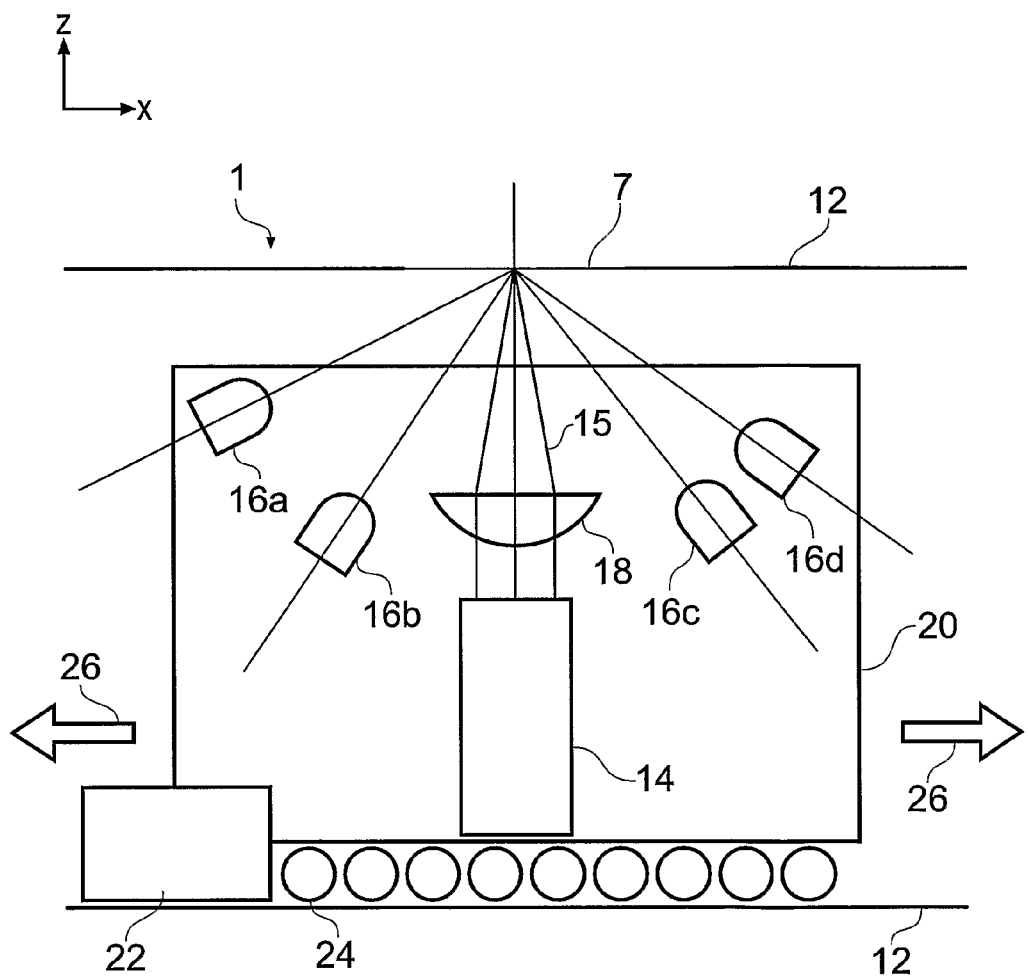
FIG. 11 is a schematic side view of a reader apparatus for scanning articles for verification.

FIG. 11 is a schematic side view of a portable scanner or reader apparatus 1 for re-scanning documents or other articles for verification purposes. The optical design is largely the same as for the scan head of FIG. 1A fitted in a printer as is evident. The same reference numerals for corresponding components have been used for ease of comparison. The principal difference between the two designs is that the scanner of FIG. 11 moves the scan head and keeps the article static, while the printer-based scanner described above moves the paper past the static scan head.

The optical reader apparatus 1 is for measuring a signature from an article (not shown) arranged in a reading volume of the apparatus. The reading volume is formed by a reading aperture 7 which is a slit in a housing 12. The housing 12 contains the main optical components of the apparatus. The slit has its major extent in the x direction (see inset axes in the drawing). The principal optical components are a laser source 14 for generating a coherent laser beam 15 and a detector arrangement 16 made up of a plurality of k photodetector elements, where k=4 in this example, labelled 16a, 16b, 16c and 16d. The laser beam 15 is focused by a cylindrical lens 18 into an elongate focus extending in the y direction (perpendicular to the plane of the drawing) and lying in the plane of the reading aperture. In an example prototype reader, the elongate focus has a major axis dimension of about 2 mm and a minor axis dimension of about 40 micrometers. These optical components are contained in a scan head subassembly 20. Further details of the optical design are as described above in relation to FIGS. 1A and 1B in particular, so are not repeated here.

A drive motor 22 is arranged in the housing 12 for providing linear motion of the optics subassembly 20 via suitable bearings 24 or other means, as indicated by the arrows 26. The drive motor 22 thus serves to move the coherent beam linearly in the x direction over the reading aperture 7 so that the beam 15 is scanned in a direction transverse to the major axis of the elongate focus.

The sampling is as described above in relation to the printer scanner, i.e. as illustrated in FIG. 2, so is not repeated here.

Figure 12:
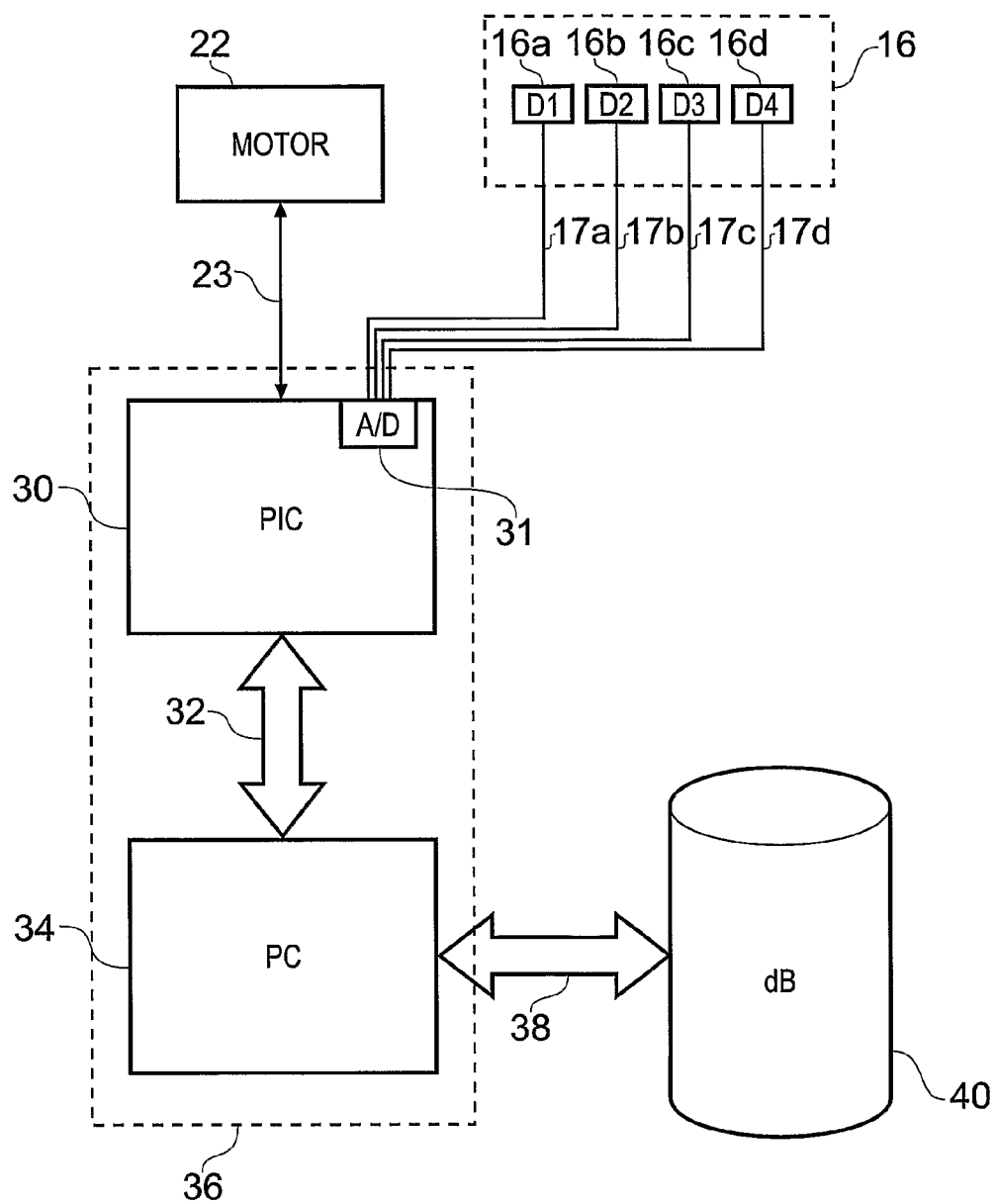
FIG. 12 is a block schematic diagram of the functional components of the reader apparatus of FIG. 11 and associated system components.

FIG. 12 is a block schematic diagram of the functional components of the reader apparatus. The motor 22 is connected to a programmable interrupt controller (PIC) 30 through an electrical link 23. The detectors 16a . . . d of the detector module 16 are connected through respective electrical connection lines 17a . . . d to an analogue-to-digital converter (ADC) that is part of the PIC 30. It will be understood that optical or wireless links may be used instead of, or in combination with, electrical links. The PIC 30 is interfaced with a personal computer (PC) 34 through a serial connection 32. The PC 34 may be a desktop or a laptop. As an alternative to a PC, other intelligent devices may be used, for example a personal digital assistant (PDA) or a dedicated electronics unit. The PIC 30 and PC 34 collectively form a data acquisition and processing module for determining a signature of the article from the set of data points collected by the detectors 16a . . . d. The PC 34 has access through an interface connection 38 to a database (dB) 40. The database 40 may be resident on the PC 34 in memory, or stored on a drive thereof. Alternatively, the database 40 may be remote from the PC 34 and accessed by wireless communication, for example using mobile telephony services or a wireless local area network (LAN) in combination with the internet. Moreover, the database 40 may be stored locally on the PC 34, but periodically downloaded from a remote source.

The database 40 contains a library of previously recorded signatures. The PC 34 is programmed so that in use it accesses the database 40 and performs a comparison to establish whether the database 40 contains a match to the signature of the article that has been placed in the reading volume.

Figure 13:
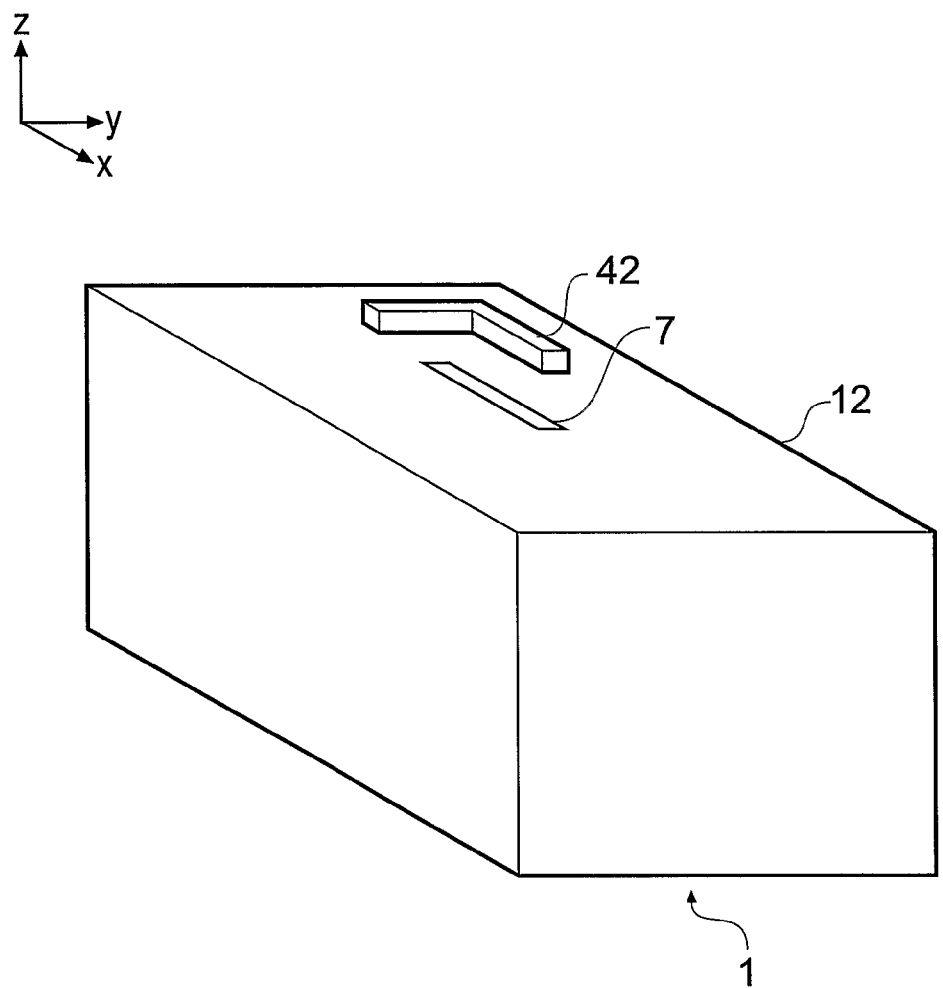
FIG. 13 is a perspective view of the reader apparatus of FIG. 11 showing its external form.

FIG. 13 is a perspective view of the reader apparatus 1 showing its external form. The housing 12 and slit-shaped reading aperture 7 are evident. A physical location aid 42 is also apparent and is provided for positioning an article of a given form in a fixed position in relation to the reading aperture 7. In the illustrated example, the physical location aid 42 is in the form of a right-angle bracket in which the corner of a document or packaging box can be located. This ensures that the same part of the article can be positioned in the reading aperture 7 whenever the article needs to be scanned. A simple angle bracket or equivalent, is sufficient for articles with a well-defined corner, such as sheets of paper, passports, ID cards and packaging boxes.

For packaging boxes, an alternative to the slit aperture would be to provide a suitable guide hole, for example a rectangular cross-section hole for accepting the base of a rectangular box or a circular cross-section hole for accepting the base of a tubular box (i.e. cylindrical box).

Figure 14:
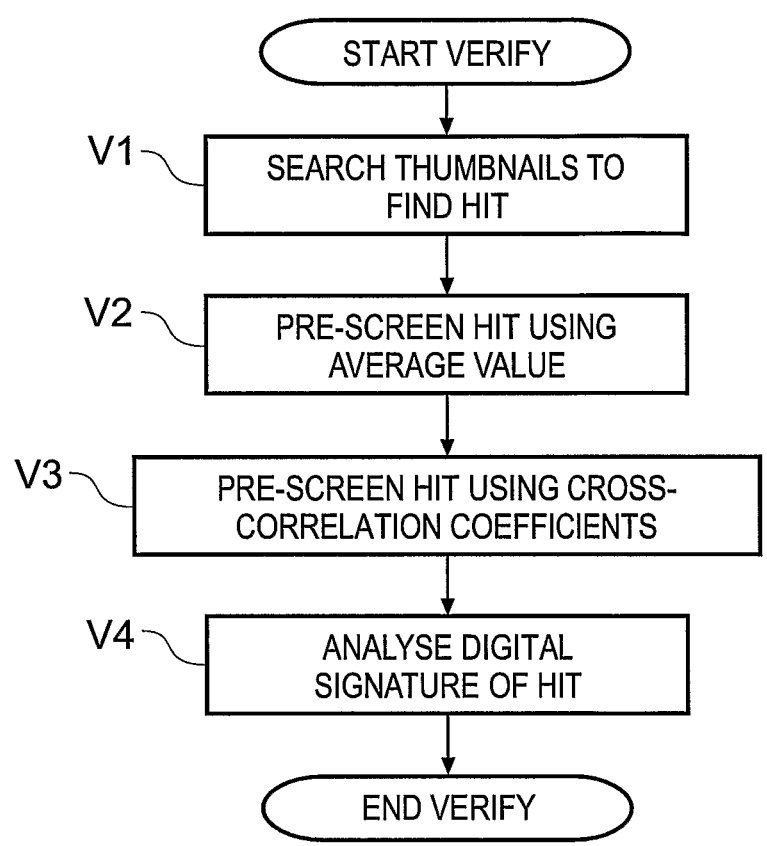
FIG. 14 is a flow diagram showing how a digital signature of an article obtained from a scan can be verified against a database in which the digital signatures of previously scanned articles are stored.

FIG. 14 is a flow diagram showing how a signature of an article obtained from a scan can be verified against a signature database.

In a simple implementation, the database could simply be searched to find a match based on the full set of signature data. However, to speed up the verification process, the process preferably uses the smaller thumbnails and pre-screening based on the computed average values and cross-correlation coefficients as now described.

The verification process takes place after scanning an article according to the process described above, i.e. to perform Scan Steps S1 to S8 illustrated in FIG. 9.

Verification Step V1 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing.

Verification Step V2 is an optional pre-screening test that is performed before analysing the full digital signature stored for the record against the scanned digital signature. In this pre-screen, the rms values obtained in Scan Step S8 are compared against the corresponding stored values in the database record of the hit. The 'hit' is rejected from further processing if the respective average values do not agree within a pre-defined range. The article is then rejected as non-verified (i.e. jump to end and issue fail result).

Verification Step V3 is a further optional pre-screening test that is performed before analysing the full digital signature. In this pre-screen, the cross-correlation coefficients obtained in Scan Step S7 are compared against the corresponding stored values in the database record of the hit. The 'hit' is rejected from further processing if the respective cross-correlation coefficients do not agree within a predefined range. The article is then rejected as non-verified (i.e. jump to end and issue fail result).

Verification Step V4 is the main comparison between the scanned digital signature obtained in Scan Step S5 and the corresponding stored values in the database record of the hit. The full stored digitised signature, $d_k^{db}(i)$ is split into n blocks of q adjacent bits on k detector channels, i.e. there are qk bits per block. A typical value for q is 4 and a typical value for k is 4, making typically 16 bits per block. The qk bits are then matched against the qk corresponding bits in the stored digital signature $d_k^{db}(i+j)$. If the number of matching bits within the block is greater or equal to some pre-defined threshold $z_{thresh}$, then the number of matching blocks is incremented. A typical value for $z_{thresh}$ is 13. This is repeated for all n blocks. This whole process is repeated for different offset values of j, to compensate for errors in placement of the scanned area, until a maximum number of matching blocks is found. Defining M as the maximum number of matching blocks, the probability of an accidental match is calculated by evaluating:

$$p(M) = \sum_{w=n-M}^{n} s^w (1-s)^{n-w} {}_w^n C$$

where s is the probability of an accidental match between any two blocks (which in turn depends upon the chosen value of $z_{threshold}$), M is the number of matching blocks and p(M) is the probability of M or more blocks matching accidentally. The value of is determined by comparing blocks within the data base from scans of different objects of similar materials, e.g. a number of scans of paper documents etc. For the case of q=4, k=4 and $z_{threshold}$=13, we find a typical value of s is 0.1. If the qk bits were entirely independent, then probability theory would give s=0.01 for $z_{threshold}$=13. The fact that we find a higher value empirically is because of correlations between the k detector channels and also correlations between adjacent bits in the block due to a finite laser spot width. A typical scan of a piece of paper yields around 314 matching blocks out of a total number of 510 blocks, when compared against the data base entry for that piece of paper. Setting M=314, n=510, s=0.1 for the above equation gives a probability of an accidental match of $10^{-177}$.

Verification Step V5 issues a result of the verification process. The probability result obtained in Verification Step V4 may be used in a pass/fail test in which the benchmark is a pre-defined probability threshold. In this case the probability threshold may be set at a level by the system, or may be a variable parameter set at a level chosen by the user. Alternatively, the probability result may be output to the user as a confidence level, either in raw form as the probability itself, or in a modified form using relative terms (e.g. no match/poor match/good match/excellent match) or other classification.

It will be appreciated that many variations are possible. For example, instead of treating the cross-correlation coefficients as a pre-screen component, they could be treated together with the digitised intensity data as part of the main signature. For example the cross-correlation coefficients could be digitised and added to the digitised intensity data. The cross-correlation coefficients could also be digitised on their own and used to generate bit strings or the like which could then be searched in the same way as described above for the thumbnails of the digitised intensity data in order to find the hits.

Figure 15:
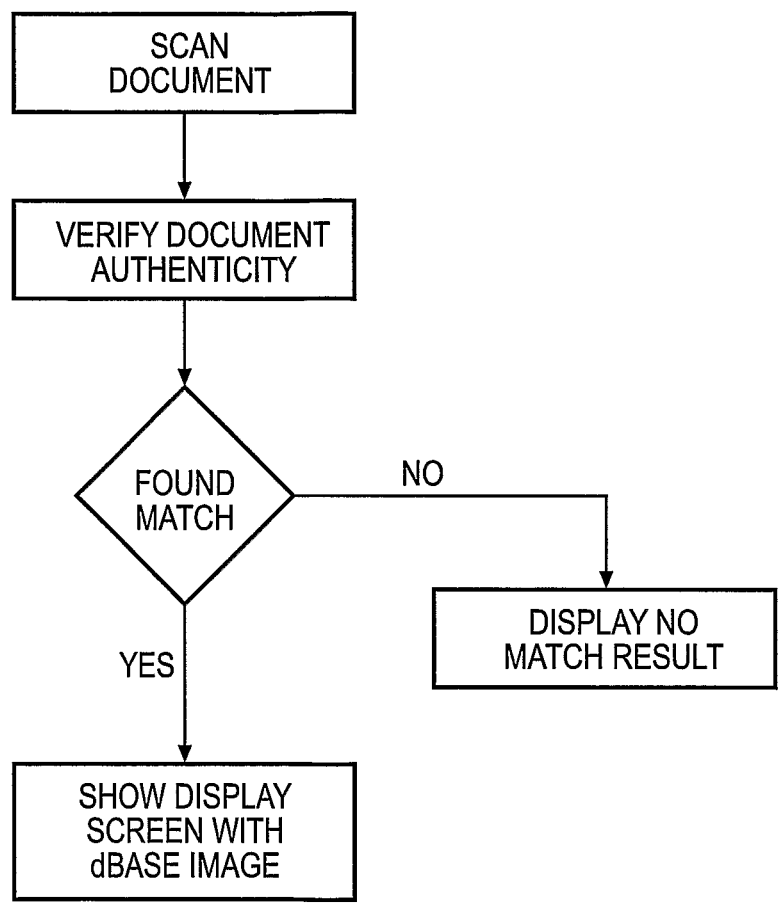
FIG. 15 is a flow diagram showing the overall process of how a document is scanned for verification purposes and the results presented to a user.

FIG. 15 is a flow diagram showing the overall process of how a document is scanned for verification purposes and the results presented to a user. First the document is scanned using the scanning system of FIGS. 11 to 13. The document authenticity is then verified using the process of FIG. 14. If there is no matching record in the database, a "no match" result is displayed to the user. If there is a match, this is displayed to the user in the form now described.

Figure 16:
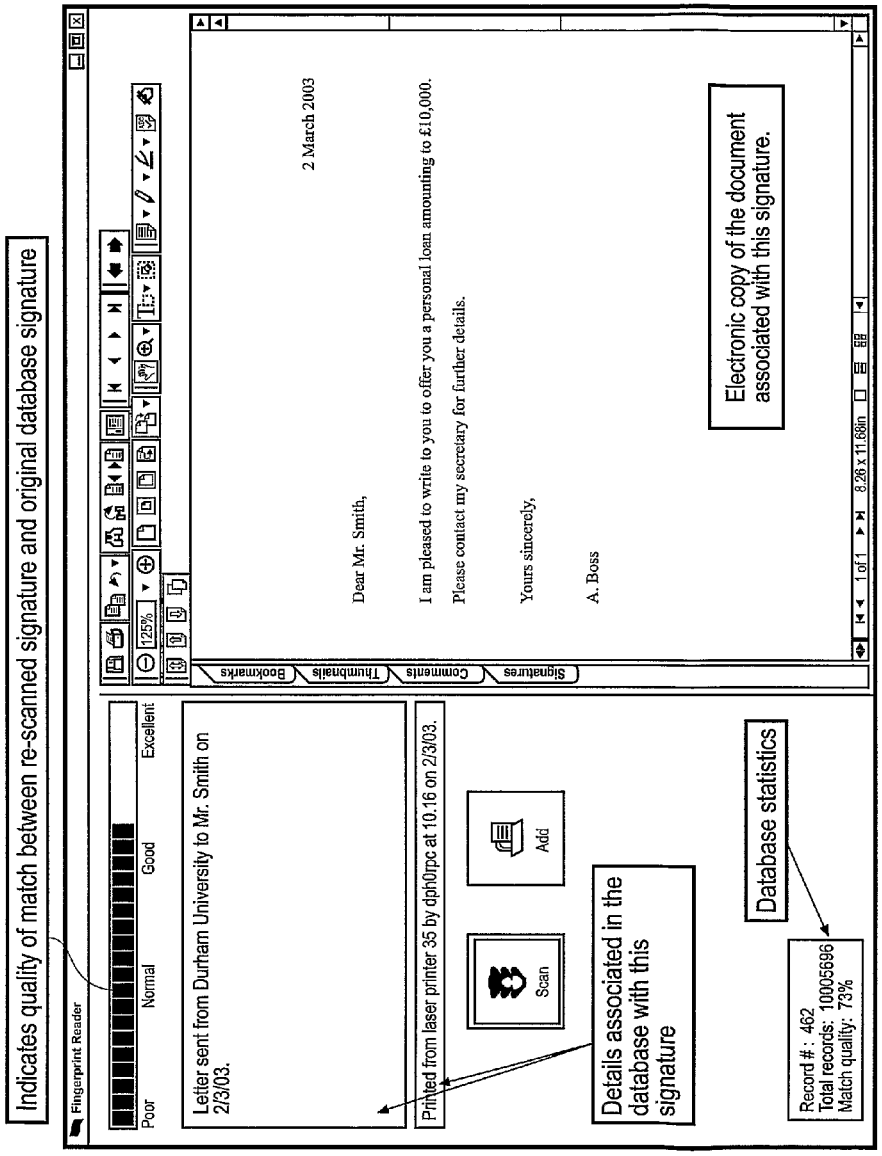
FIG. 16 is a screen shot of the user interface displayed when a re-scanned document is verified as being authentic.

FIG. 16 is a screen shot of the user interface displayed when a re-scanned document is verified as being authentic. In the main right-hand window, a visual representation of the document stored in the database record with the matching digital signature is presented. This is an electronic copy of the document associated with the matching digital signature. In the figure, this document is a letter formally offering a loan. Another example would be the photograph page of a passport, but it will be appreciated there are limitless examples. On the left side of the screen a confidence level indicator bar. This is a graphic indicator of the probability result, as described with reference to FIG. 14. The bar is labelled left-to-right with "Poor-Normal-Good-Excellent" as a relative indicator of match quality. There is also shown some bibliographic data, namely in the large text window some narrative text descriptive of the document is displayed. This could be automatically generated at source, for example when the application software environment includes a document management system. A smaller text window displays bibliographic data identifying the printer on which the document was generated, the user i.d. of the user who generated it, and the generation date/time. Database statistics can also be shown, such as the record number as illustrated in the bottom left corner of the screen.

It will thus be appreciated that when a database match is found the user is presented with relevant information in an intuitive and accessible form to allow the user to apply his or her own common sense for an additional, informal layer of verification. Clearly, the document image should look like the document presented to the verifying person, and other factors will be of interest such as the confidence level and bibliographic data relating to document origin. The verifying person will be able to apply their experience to make a value judgement as to whether these various pieces of information are self consistent.

A further implementation of the invention is now described.

Figure 17:
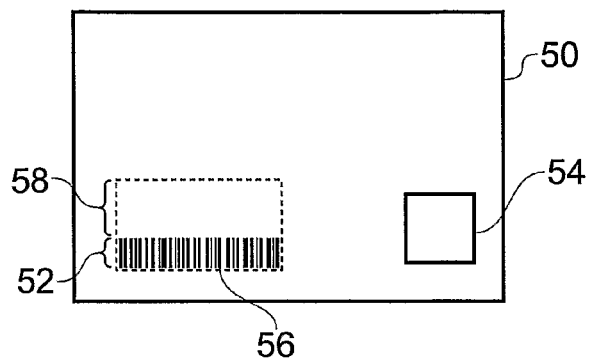
FIG. 17 is a schematic plan view of an ID card bearing a barcode label that encodes a digital signature obtained from an intrinsic measured surface characteristic.

FIG. 17 shows an ID card 50 bearing a barcode. The ID card may also bear an independent security element 54 such as a photograph, hologram or contain some biometric information specific to an individual. The barcode is shown as part of a scan area 56. This is illustrated with a dashed line, since it is featureless on the ID card. The scan area is subdivided between a lower area 52 containing the barcode and a blank upper area 58. The ID card 50 is designed to be scanned by a reader apparatus of the kind illustrated in FIG. 6, where one of the directional detector banks is used to scan the barcode area 52 and the other two banks to scan the upper area 58. In this embodiment, the barcode encodes the signature obtained by scanning the blank upper area using the method of the invention.

In other words, the barcode was originally applied at the time of manufacture of the ID card by scanning the blank upper area of the card according to the method of the invention and then printing the barcode onto the lower area 52. The ID card is thus labelled with a signature characteristic of its intrinsic structure, namely the surface structure in the upper area 58.

It will be appreciated that this basic approach can be used to mark a wide variety of articles with a label that encodes the articles own signature obtained from its intrinsic physical properties, for example any printable article, including paper or cardboard articles or plastic articles.

Given the public nature of the barcode or other label that follows a publicly known encoding protocol, it is advisable to make sure that the signature has been transformed using an asymmetric encryption algorithm for creation of the barcode, i.e. a one-way function is used, such as according to the well known RSA algorithm. A preferred implementation is for the label to represent a public key in a public key/private key encryption system. If the system is used by a number of different customers, it is advisable that each customer has its own private key, so that disclosure of a private key will only affect one customer. The label thus encodes the public key and the private key is located securely with the authorised persons.

In an embodiment, a printing device with a duplex sheet feeder is used, which allows a sheet of paper to pass through it twice. This may be once on each side for two-sided printing, or twice on the same side for printing twice on the same side. The first pass is used to acquire the unique digital signature from the sheet using the scan head integrated in the printing device. The second pass then immediately prints a barcode, or other encoding label, containing an encrypted version of the digital signature onto the paper. This gives the possibility of 'without database' checks on the document, although clearly the stored image of the document could not be checked without reference to a database. It is also possible to add other information to the bare ode. A specific example of where this might be useful is in printing of cheques. The value of the cheque and optionally also a hash of the drawer's name could be included in the barcode.

In another embodiment, the paper or other printable article is scanned first to allow the digital signature to be determined before any printing takes place. The printing of the image and the barcode encoding the digital signature can then take place in one printing action.

It will be further understood that the barcode or other label could also be used to encode other information, either ancillary to the digital signature or unrelated to the digital signature.

A further perceived advantage of the labelling approach is that a novice user would be unaware of the verification being carried out without special knowledge. It would be natural for the user to assume that the reader apparatus was simply a barcode scanner, and it was the barcode that was being scanned.

The labelling scheme could be used to allow articles to be verified without access to a database purely on the basis of the label. This is a similar approach conceptually to the failed banknote scheme reported in the prior art [4].

However, it is also envisaged that the labelling scheme could be used in combination with a database verification scheme. For example, the barcode could encode a thumbnail form of the digital signature and be used to allow a rapid pre-screen prior to screening with reference to a database. This could be a very important approach in practice, since potentially in some database applications, the number of records could become huge (e.g. millions) and searching strategies would become critical. Intrinsically high speed searching techniques, such as the use of bitstrings, could become important As an alternative to the barcode encoding a thumbnail, the barcode (or other label) could encode a record locator, i.e. be an index or bookmark, which can be used to rapidly find the correct signature in the database for further comparison.

Another variant is that the barcode (or other label) encodes a thumbnail signature which can be used to get a match with reasonable but not high confidence if a database is not available (e.g. temporarily off-line, or the scanning is being done in an unusually remote location without internet access). That same thumbnail can then be used for rapid record locating within the main database if the database is available, allowing a higher confidence verification to be performed.

Figure 18:
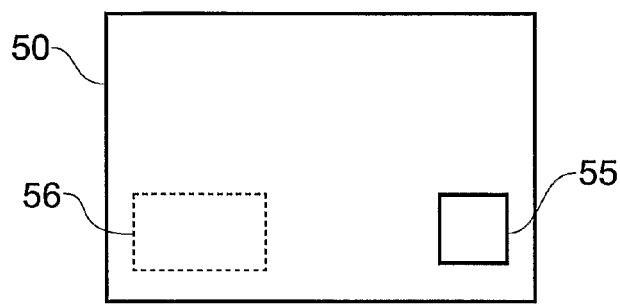
FIG. 18 is a schematic plan view of an ID card with a chip carrying data that encodes a digital signature obtained from an intrinsic measured surface characteristic.

FIG. 18 is a schematic plan view of an ID card 50 which is a so-called smart card that incorporates a data carrying chip 54. The data carried by the chip 54 includes signature encoding data that encodes a digital signature obtained from an intrinsic measured surface characteristic of the ID card 50 obtained from a scan area 56 which is featureless in this example as indicated by the dotted lines, but could be decorated in any desired way, or contain a photograph, for example.

Figure 19:
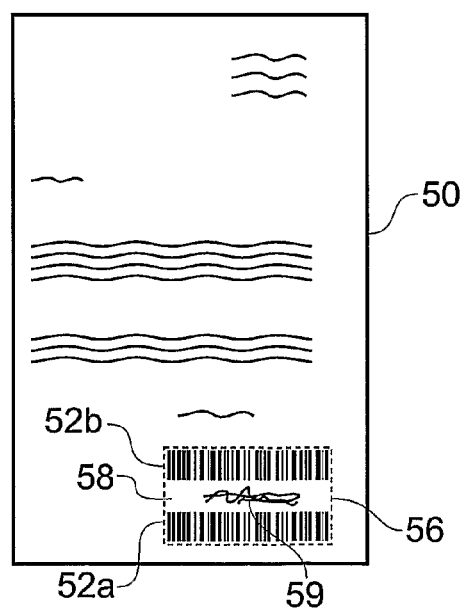
FIG. 19 is a schematic plan view of a warranty document bearing two barcode labels that encode a digital signature obtained from an intrinsic measured surface characteristic.

FIG. 19 is a schematic plan view of a warranty document 50. The scan area 56 includes two barcode labels 52a, 52b arranged one above the other which encode a digital signature obtained from an intrinsic measured surface characteristic, similar to the ID card example of FIG. 17. The barcodes 52a, 52b are arranged above and below a digital signature scan area 58 for a person's signature 59 as schematically illustrated. The area 58 at least is preferably covered with a transparent adhesive covering for tamper protection.

Many other commercial examples will be envisaged, the above FIGS. 17 to 19 given by way of example only.

From the above detailed description it will be understood how an article made of a printable material, such as paper or cardboard, or plastic, can be created and identified by exposing the material to coherent radiation, collecting a set of data points that measure scatter of the coherent radiation from intrinsic structure of the material, and determining a signature of the article from the set of data points.

It will also be understood that the scan area is essentially arbitrary in terms of its size or location on the printable surface of an article. If desired, the scan could be a linear scan rastered to cover a larger two-dimensional area, for example.

Moreover, it will be understood how this can be applied to identify a product by its packaging, a document or an item of printable clothing, by exposing the article to coherent radiation, collecting a set of data points that measure scatter of the coherent radiation from intrinsic structure of the article, and determining a signature of the product from the set of data points.

From the above description of the numerical processing, it will be understood that degradation of the beam localisation (e.g. beam cross-section enlargement in the reading volume owing to sub-optimum focus of the coherent beam) will not be catastrophic to the system, but merely degrade its performance by increasing the accidental match probability. The apparatus is thus robust against apparatus variations giving a stable gradual degradation in performance rather than a sudden unstable failure. In any case, it is simple to perform a self test of a reader, thereby picking up any equipment problems, by performing an autocorrelation on the collected data to ascertain the characteristic minimum feature size in the response data.

A further security measure that can be applied to paper or cardboard, for example, is to adhesively bond a transparent seal (e.g. adhesive tape) over the scanned area. The adhesive is selected to be sufficiently strong that its removal will destroy the underlying surface structure which it is essential to preserve in order to perform a verification scan. The same approach can be applied to deposition of transparent polymer or plastic films on a card, or its encapsulation with similar materials.

As described above, the reader may be embodied in an apparatus designed specifically to implement the invention. In other cases, the reader will be designed by adding appropriate ancillary components to an apparatus principally designed with another functionality in mind, such as a photocopier machine, document scanner, document management system, POS device, ATM, air ticket boarding card reader or other device.

Many other variations of the invention will be envisaged by the skilled person in addition to those specifically mentioned above.

It will be appreciated that although particular embodiments of the invention have been described, many modifications/additions and/or substitutions may be made within the spirit and scope of the present invention.

REFERENCES

[1] PCT/GB03/03917—Cowburn
[2] GB 2 221 870 A—Ezra, Hare & Pugsley
[3] U.S. Pat. No. 6,584,214—Pappu, Gershenfeld & Smith
[4] Kravolec "Plastic tag makes foolproof ID" Technology Research News, 2 Oct. 2002
[5] R Anderson "Security Engineering: a guide to building dependable distributed systems" Wiley 2001, pages 251-252 ISBN 0-471-38922-6
[6] U.S. Pat. No. 5,521,984
[7] U.S. Pat. No. 5,325,167

The invention claimed is:

1. An apparatus for creating authenticatable articles, comprising:
a printer driver that creates instructions for a printing device to print an image;
a data acquisition interface that receives a set comprising groups of data points from a printing device comprising:
a feed mechanism that conveys an article through the printing device; and
a scan head that scans an article conveyed through the printing device by the feed mechanism, the scan head comprising:
a coherent source that emits light as an article is conveyed past the scan head by the feed mechanism so as to sequentially illuminate a plurality of regions of an article; and
a detector arrangement that detects light scattered from surface structure of the article so as to collect a set comprising groups of data points wherein each of the groups of data points relates to scatter caused by surface structure from the respective different regions of the surface of the article;
and
a processor that processes the set of groups of data points to determine a digital signature of the article and processes the digital signature to determine a printable label pattern that encodes the digital signature according to a machine-readable encoding protocol; and
wherein the printer driver further creates instructions for the printing device to print the label pattern onto the article.

2. An apparatus for verifying the authenticity of articles, comprising:
a scanning device that scans an article conveyed relative to the scanning device, the scanning device comprising:
a coherent source that emits light as an article is conveyed relative to the scanning device by the feed mechanism so as to sequentially illuminate a plurality of regions of an article; and
a detector arrangement that detects light scattered from surface structure of the article so as to collect a set comprising groups of data points wherein each of the groups of data points relates to scatter caused by surface structure from the respective different regions of the surface of the article;

a processor that processes the set of groups of data point to determine a digital signature of the article;

a reading device that reads a printed label from the article;

a decoder that decodes the read label to extract a previously determined signature for the article; and a signature verification module that compares the determined digital signature and the previously determined digital signature to establish whether a match exists.

3. Apparatus comprising:

an article transport that conveys articles to be printed along an article transport path;

an article scanner arranged adjacent the article transport path, the article scanner comprising:
  a light source that emits coherent light as an article is conveyed along the article transport path relative to the article scanner, thereby sequentially illuminating a plurality of regions of an article; and
  a detector arrangement that detects light scattered from surface structure of an article illuminated by light from the light source and creates a set of data points describing the light intensity received at the detector arrangement, the detector arrangement sequentially outputting the set of data points in groups of data points wherein each group of data points relates to scatter caused by surface structure from a respective different region of the surface of the article;

a processor that receives the set of groups of data points and processes the set of groups of data points to determine a digital signature of the article and that processes the digital signature to determine a printable label pattern that encodes the digital signature according to a machine-readable encoding protocol; and a print head that prints the label pattern onto the article.

4. The apparatus of claim 3, further comprising:

a reading device that reads a printed label from an article conveyed along the article transport path;

a decoder that decodes the read label to extract a previously determined signature for the article; and a signature verification module that compares the determined digital signature and the previously determined digital signature to establish whether a match exists.

5. An apparatus for creating authenticatable articles, comprising:

a printer driver that creates instructions for a printing device to print an image;

a data acquisition interface that receives a set comprising groups of data points from a printing device comprising:
  a feed mechanism that conveys an article past the print head; and
  a scan head that scans an article conveyed through the printing device by the feed mechanism, the scan head comprising:
    a coherent source that emits light as an article is conveyed past the scan head by the feed mechanism to sequentially illuminate each of a plurality of regions of a surface of an article; and
    a detector arrangement, that detects light scattered from surface structure of the article to collect a set comprising groups of data points wherein each of the groups of data points relates to scatter caused by surface structure from the respective different regions of the surface of the article; and a processor that that processes the set of groups of data points to determine a digital signature of the article and creates a record in a database, wherein the record includes the digital signature and a representation of the image.

6. An apparatus for verifying the authenticity of articles, comprising:

a scanning device that scans an article conveyed relative to the scanning device, the scanning device comprising:
  a coherent source that emits light as an article is conveyed relative to the scanning device by the feed mechanism so as to sequentially illuminate a plurality of regions of a surface of an article; and
  a detector arrangement that detects light scattered from surface structure of the article so as to collect a set comprising groups of data points wherein each of the groups of data points relates to scatter caused by surface structure from the respective different regions of the surface of the article;

a processor that processes the set of groups of data point to determine a digital signature of the article;

a database comprising a plurality of records of previously scanned articles, each record including the digital signature previously determined for that article and a visual representation of that article; and a signature verification module that searches the database to establish whether there is a match between a digital signature obtained by the scanning device and a digital signature stored in one of the records, and that displays, if a match is found, the visual representation of the article stored in the record with the match.

7. Apparatus comprising:

an article transport that conveys articles to be printed along an article transport path;

an article scanner arranged adjacent the article transport path, the article scanner comprising:
  a light source that emits coherent light as an article is conveyed along the article transport path relative to the article scanner, thereby sequentially illuminating a plurality of regions of an article; and
  a detector arrangement that detects light scattered from surface structure of an article illuminated by light from the light source and creates a set of data points describing the light intensity received at the detector arrangement, the detector arrangement sequentially outputting the set of data points in groups of data points wherein each group of data points relates to scatter caused by surface structure from a respective different region of the surface of the article;

a processor that receives the set of groups of data points and processes the set of groups of data points to determine a digital signature of the article and that sends the digital signature and a visual representation of the article to be stored to a database.

8. The apparatus of claim 7, further comprising:

a signature verification module that searches the database to establish whether there is a match between a digital signature obtained by the scanning device and a digital signature stored in a record of the database, and that displays, if a match is found, the visual representation of the article stored in the record with the match.

* * * * *